United States Patent
Heller et al.

(10) Patent No.: US 10,336,295 B2
(45) Date of Patent: *Jul. 2, 2019

(54) EMBLEM FOR A MOTOR VEHICLE WITH A SENSOR SYSTEM FOR MONITORING A DETECTION REGION AND AN ACTUATION REGION AND METHOD THERETO

(71) Applicant: Huf Hülsbeck & Fürst GmbH & Co. KG, Velbert (DE)

(72) Inventors: Norbert Heller, Grefrath (DE); Helmut Schumacher, Coesfeld (DE); Mirko Schindler, Velbert (DE); Oliver Müller, Velbert (DE); Bernd Ette, Wolfsburg (DE); Nadine Sticherling, Essen (DE); Alexander Ziegler, Wülfrath (DE); Jean Malabo Yomkil, Essen (DE); Stefan Mönig, Schwelm (DE); Iko Lindic, Essen (DE); Christof Hache, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/115,642

(22) PCT Filed: Jan. 7, 2015

(86) PCT No.: PCT/DE2015/100008
§ 371 (c)(1),
(2) Date: Jul. 29, 2016

(87) PCT Pub. No.: WO2015/113554
PCT Pub. Date: Aug. 6, 2015

(65) Prior Publication Data
US 2017/0166167 A1 Jun. 15, 2017

(30) Foreign Application Priority Data
Jan. 31, 2014 (DE) .......................... 10 2014 101 198

(51) Int. Cl.
*G08B 21/00* (2006.01)
*B60R 25/24* (2013.01)
(Continued)

(52) U.S. Cl.
CPC .............. *B60R 25/24* (2013.01); *B60R 25/10* (2013.01); *B60R 25/305* (2013.01); *E05F 15/70* (2015.01);
(Continued)

(58) Field of Classification Search
CPC ................ B60R 25/24; G07C 9/00309; G07C 9/00182; G07C 2009/00984
(Continued)

(56) References Cited

U.S. PATENT DOCUMENTS

| 5,427,146 A | 6/1995 | Bakken et al. |
| 2005/0046584 A1* | 3/2005 | Breed ..................... B60C 11/24 340/13.31 |

(Continued)

FOREIGN PATENT DOCUMENTS

| CN | 2132888 Y | 5/1993 |
| CN | 101144544 A | 3/2008 |

(Continued)

OTHER PUBLICATIONS

Notification of the First Office Action for related Chinese application No. 201580006089.5 dated Mar. 5, 2018, with its English translation, 22 pages.
(Continued)

*Primary Examiner* — Mark S Rushing
(74) *Attorney, Agent, or Firm* — Rudy J. Ng; Bret E. Field; Bozicevic, Field & Francis LLP

(57) ABSTRACT

The invention relates to an emblem (80) for a motor vehicle (1), comprising an optical sensor system (30) which is suitable for a) monitoring a detection region (21) lying
(Continued)

Figure 1:
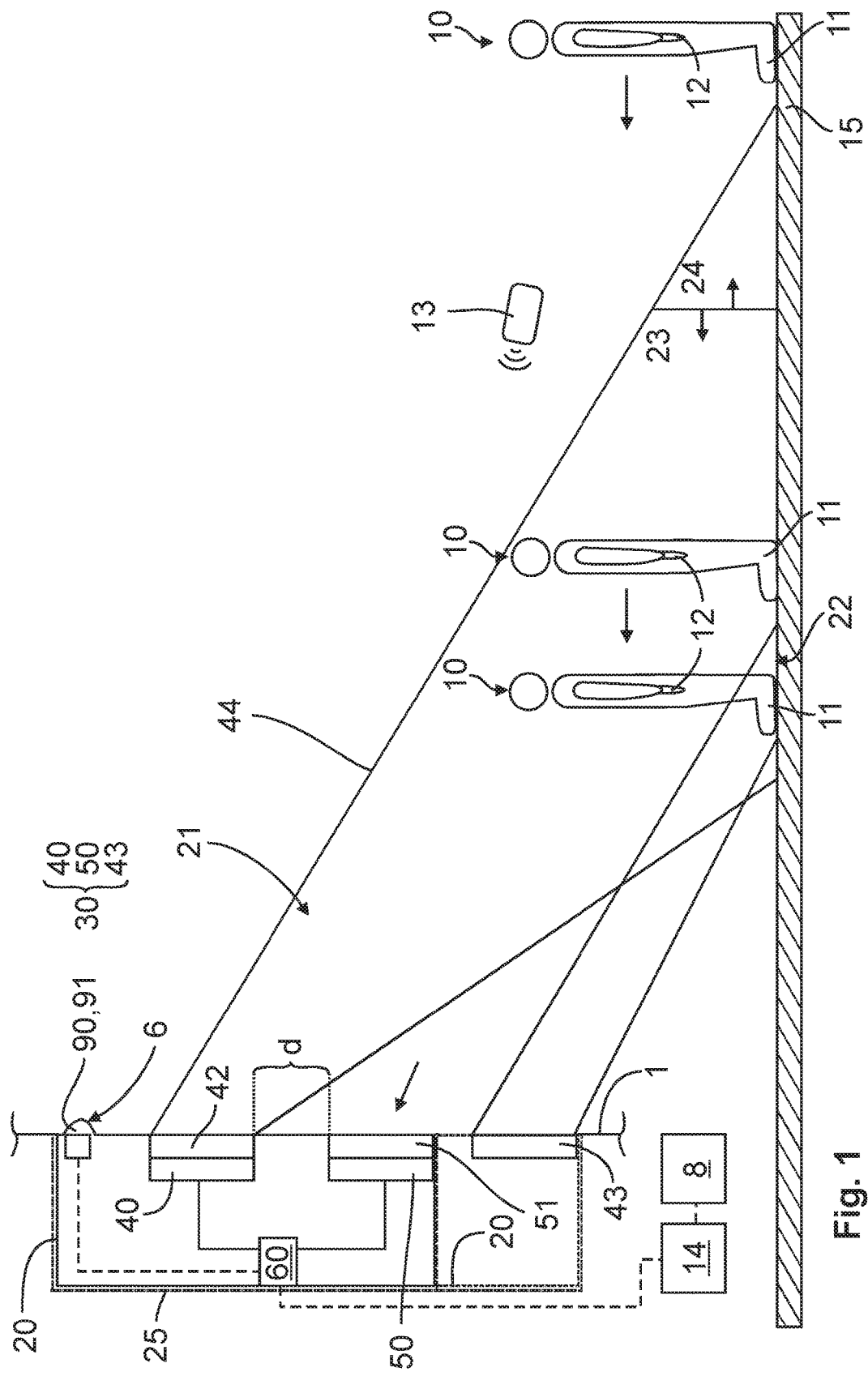

outside of the motor vehicle (1), b) triggering a signal for starting an authentication check between an ID transmitter (13) and the motor vehicle (1) in the event that a user (10) is detected in the detection region (21), c) monitoring an actuation region (22) which lies outside of the motor vehicle (1) and which differs from the detection region (21), and d) providing an operating signal for the motor vehicle (1) in the event that a user (10) is detected in the actuation region (22).

22 Claims, 11 Drawing Sheets

(51) Int. Cl.
  *G07C 9/00* (2006.01)
  *E05F 15/70* (2015.01)
  *B60R 25/10* (2013.01)
  *B60R 25/30* (2013.01)
(52) U.S. Cl.
  CPC .... *G07C 9/00309* (2013.01); *E05Y 2900/531* (2013.01); *E05Y 2900/546* (2013.01)
(58) Field of Classification Search
  USPC .......................................................... 340/5.61
  See application file for complete search history.

(56) References Cited

U.S. PATENT DOCUMENTS

2008/0296926 A1\* 12/2008 Hanzel ................ B60R 25/2054
                                                    296/146.1
2010/0214112 A1\* 8/2010 Ishihara ................ B60R 25/246
                                                    340/686.1
2011/0043325 A1\* 2/2011 Newman ................ E05F 15/73
                                                    340/5.2
2013/0200995 A1\* 8/2013 Muramatsu ............ E05F 15/73
                                                    340/5.51
2014/0330486 A1\* 11/2014 Gehin ................ B60R 25/2054
                                                    701/49

FOREIGN PATENT DOCUMENTS

| | | |
|---|---|---|
| CN | 101784424 A | 7/2010 |
| CN | 101896748 A | 11/2010 |
| DE | 102005032402 B3 | 9/2006 |
| DE | 102008021989 A1 | 12/2008 |
| DE | 102007050094 A1 | 4/2009 |
| DE | 102009023594 A1 | 12/2010 |
| DE | 102010060364 A1 | 5/2012 |
| DE | 102010056171 A1 | 6/2012 |
| DE | 102011115760 A1 | 4/2013 |
| JP | 2007-526453 A | 9/2007 |
| WO | WO2009035467 A1 | 3/2009 |
| WO | WO2013037806 A1 | 3/2013 |

OTHER PUBLICATIONS

Notice of Reasons for Rejection for related Japanese application No. 2016-567132 dated Aug. 21, 2018, with its English translation.

\* cited by examiner

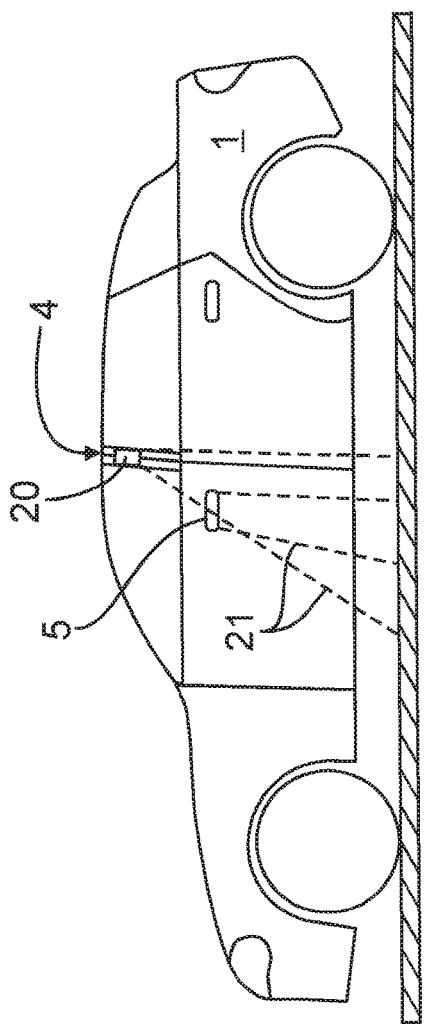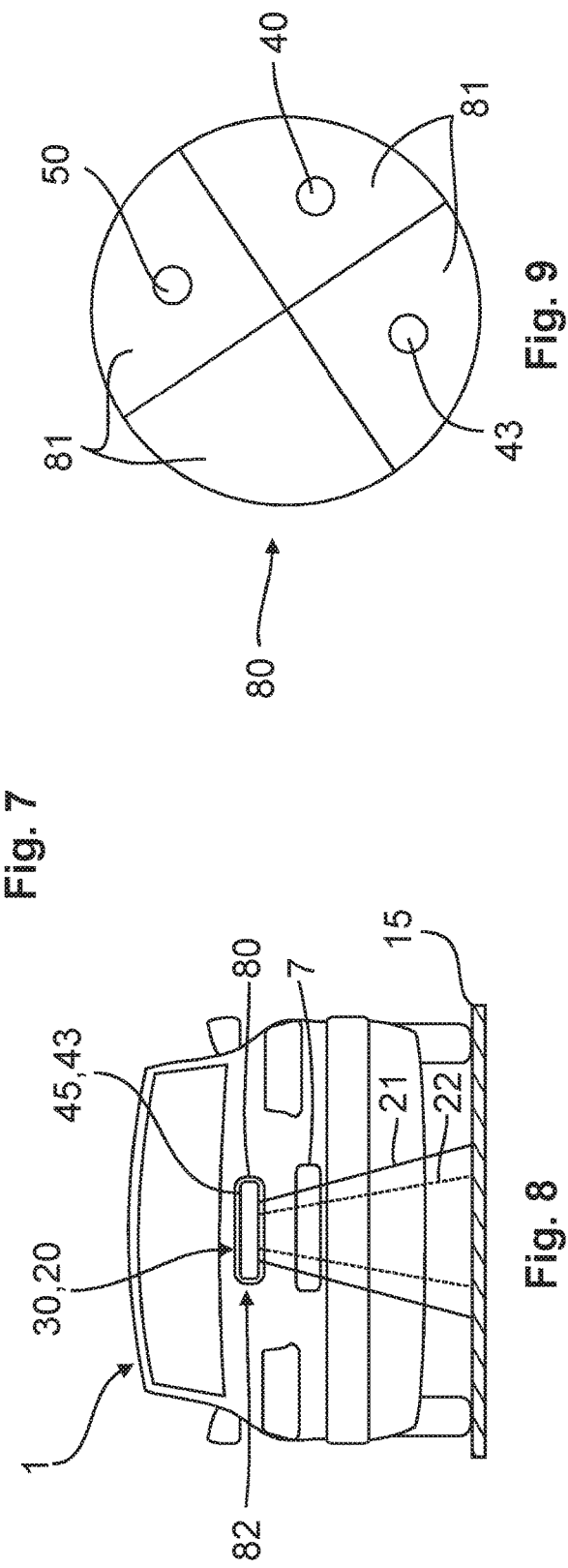

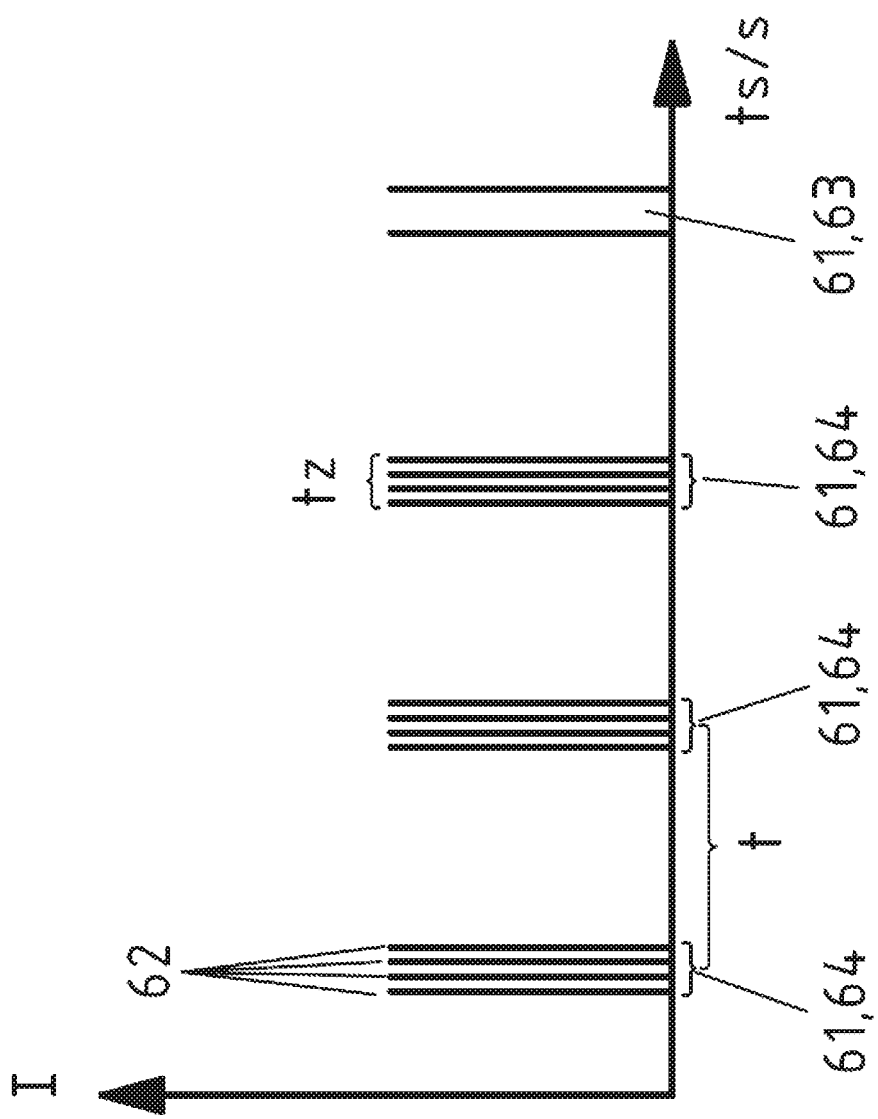

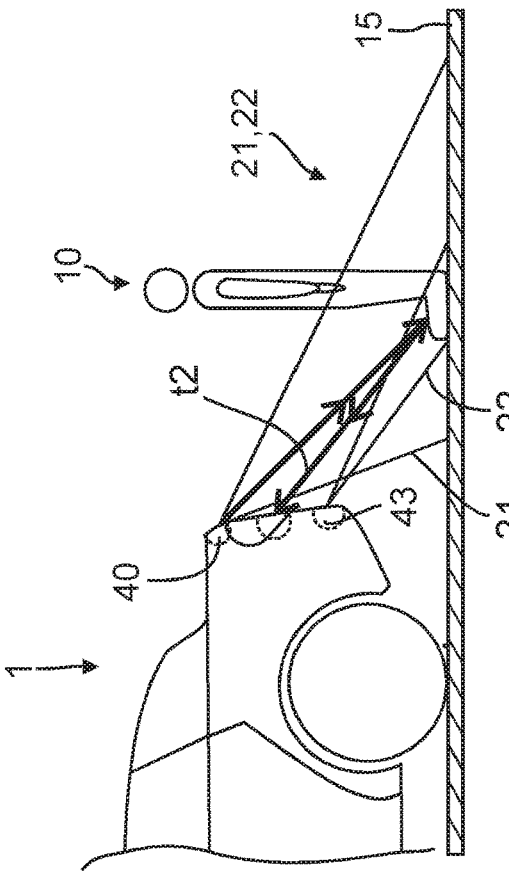
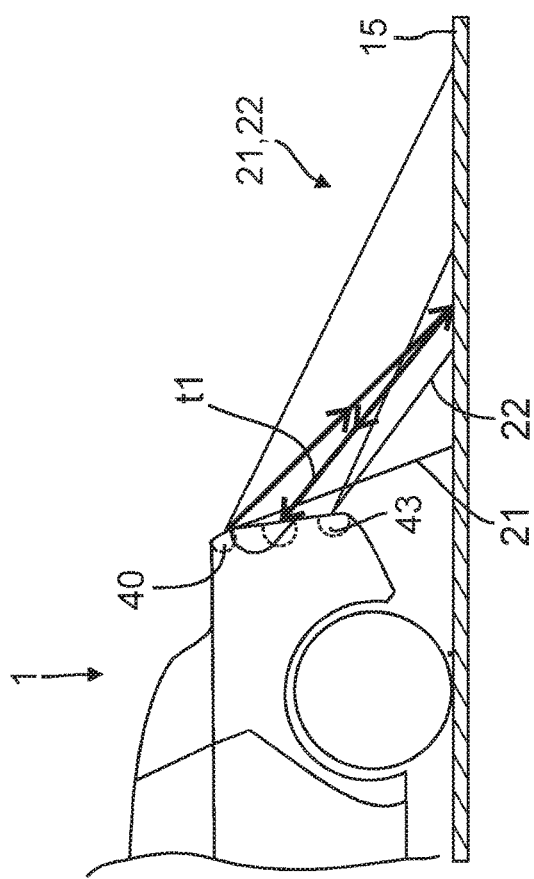

EMBLEM FOR A MOTOR VEHICLE WITH A SENSOR SYSTEM FOR MONITORING A DETECTION REGION AND AN ACTUATION REGION AND METHOD THERETO

The invention relates to an emblem for a motor vehicle and to a method for triggering an operating signal for a motor vehicle with an emblem that can be fastened to a motor vehicle.

From the prior art it is known to arrange on a motor vehicle in defined places an emblem which for example carries a company trademark, logo, etc. In addition it is known to additionally use the so-called emblem as opening aid for a boot lid, wherein the emblem is moveably mounted on the body and the user, by way of a deliberate action, moves or pivots the emblem in order to be able to open the boot lid. It is known, furthermore, to arrange a camera behind an emblem that is pivotably mounted on the motor vehicle, which can serve for recording images of the rear region of the motor vehicle, the recording of images taking place only once the reverse gear is engaged. Here, this device serves as parking aid. Here, the camera detects a default region on the boot lid, the image information being directed into the interior for the driver.

Object of the present invention is to further develop an emblem for a motor vehicle, by which the functionality of a conventional emblem, which merely serves as company identification, is increased.

The object of the present invention is solved by way of all characterising features of claim 1. Possible further developments are described in the dependent device claims.

According to the invention, the emblem for a motor vehicle comprises a sensor system which is suitable
  a) for monitoring a detection region lying outside the motor vehicle,
  b) for triggering a signal for starting an authentication verification between an Id-transmitter and the motor vehicle in the event of a user being detected in the detection region,
  c) for monitoring an actuation region lying outside the motor vehicle and which differs from the detection region,
  d) for providing an operating signal for the motor vehicle in the event that a user is detected in the actuation region.

The emblem with the sensor system constitutes an assembly module for the motor vehicle, which can be arranged in defined positions on the motor vehicle. The sensor system advantageously serves for an access check and/or access facilitation for motor vehicles, wherein the sensor system monitors and can detect an object, in particular a user, approaching the motor vehicle. For this purpose, the sensor system checks a detection region, which in particular with respect to its dimensions is fixed, in the region of the motor vehicle, in that it can detect the user or the object by measurement. In addition there exists an actuation region, advantageously in the detection region, which serves for triggering at least one function on the motor vehicle, which in particular is triggered by the operating signal. This takes place only when a corresponding actuation of the actuation region by the user is perceived by the sensor system. This function can for example be an opening and/or closing of a door, boot lid etc. Further functions are likewise conceivable. When the user is present in the detection region, which the sensor system detects, the authentication check between the Id-transmitter, which the user carries on him, and the motor vehicle, initially takes place. When the authentication check is positive, the sensor system subsequently monitors an actuation region which can differ from the detection region in its dimension and in the case of a detection of the user in the mentioned actuation region, the sensor system can provide an operating signal for the motor vehicle in order to trigger a function on the motor vehicle. The monitoring of the detection region, the start of the authentication check, the monitoring of the actuation region and the providing of the operating signal can take place by way of a control unit of the sensor system.

Because of the fact that the detection region is monitored and in the case of a detecting of the user in the detection region the authentication check is started, in particular no active action of a user is necessary in order to perform the start of an authentication check. Preferentially, the start of the authentication check is rather initiated by the user unnoticed. Thus it can be provided that the sensor system initiates a passive keyless entry check. A passive keyless entry check is to mean a method with which unnoticed by the user an authentication check takes place. The authentication check during a passive keyless entry check need not be initiated by the user through a deliberate action.

Advantageously, the optical sensor system can be suitable for switching on an illumination element arranged on the sensor system for a first illumination state, in the case that the authentication check according to b) is positive. It is conceivable that the illumination element is not active initially, which means, is switched off and does not emit any light for the user. Once the user enters the detection region, an authentication check initially takes place. If the authentication check is positive, only then does the illumination element assume the first "active" illumination state. By way of the first illumination state of the illumination element, the user is visually requested to carry out and/or perform a deliberate action in the actuation region, in particular in the region of the illumination element so that the operating signal for the motor vehicle can be provided. It is particularly advantageous that merely one sensor system is responsible for the monitoring of the detection region and of the actuation region.

It can be substantial for the invention, furthermore, that the sensor system is suitable for monitoring an actuation region lying outside the motor vehicle which differs from the detection region, wherein the illumination element is in a second illumination state which differs from the first illumination state. The actuation region is generally dimensioned smaller than the detection region, wherein advantageously the actuation region at least partially lies within the detection region. During the monitoring of the actuation region by the sensor system, the illumination element can change into the second illumination state. The change from the first illumination state to the second illumination state can be defined for example chronologically fixed. It is conceivable, for example, that the user during the first illumination state of the illumination element holds a part of the body into the actuation region, in particular against the illumination element. After a defined time, the illumination element changes into the second illumination state which is intended for example to animate the user to perform a further deliberate action within the actuation region, in particular to remove his hand or slightly move away with the entire user body from the illumination element, in particular a step away. When the user performs this deliberate action, specifically within a predetermined time, the operating signal for the motor vehicle is provided. Otherwise, the operating signal for the motor vehicle is not triggered.

It is additionally conceivable that the sensor system is designed as optical sensor system and/or that the sensor system comprises a non-optical sensor, which is in particular a proximity sensor or a tactile sensor or a capacitive sensor.

A measure improving the invention can provide that the sensor system comprises an optical sensor and a light module, with which light is emittable in order to let a detection region be created, wherein the sensor is designed to receive light from the detection region and/or the actuation region, wherein in particular the detection region is not visible to the user and/or that the light module comprises a plurality of light sources. Here, the sensor system monitors the detection region, specifically also when the actuation region is monitored at the same time. By using a sensor system, detecting a user can be fixed to the predetermined detection region outside the motor vehicle which can be defined as a space portion. The larger forms of the detection region result from the construction of the sensor system. Here it is possible for example to fix the detection region so that the user is detected in the detection region before initiating triggering an operating signal. Thus, the user can be detected earlier than is the case when using a capacitive sensor known from the prior art. On the other hand, it is possible to restrict the detection region to a predetermined portion which for example would not be possible when using a high-frequency signal for detecting a user, which is also employed in the prior art. Thus, only users which are present near the sensor system can be detected. Thus, a user, by way of the detection region fixed by the sensor system, can be detected, on the one hand, timely and on the other hand, very specifically. The light serves for letting the detection region be created, wherein the light module can comprise a lens system. It can be provided that the detection region is invisible to the user. To this end, the light module emits light in the invisible range. In particular, the light can be infrared rays. The light module can comprise only one light source. Alternatively, the light module can comprise multiple light sources. The light sources can be arranged about the optical sensor. Accordingly, light sources can be arranged for example on the left and right, above or below the optical sensor. Alternatively, the light sources can be arranged about the circumference of the optical sensor. The light can be a laser light.

It is additionally conceivable that the optical sensor system comprises the non-optical sensor in order to let the detection region be created and/or to monitor the detection region. The optical sensor can be employed for checking the actuation region.

The sensor system can comprise an optical sensor. The optical sensor can be designed in order to receive light from the detection region. The optical sensor takes images of the detection region and of the actuation region, which is arranged on the illumination element. Each image can be composed in particular of a total number of pixels. The optical sensor can comprise an image sensor, which has the total number of the pixels. The image sensor can be a CMOS-sensor and/or an LDPD-sensor. The LDPD-sensor (lateral drift field photo detector) is suitable to be particularly rapidly highly evaluated and to consume little energy.

Advantageously, the actuation region can lie in the vicinity, adjacent to and/or spaced from the illumination element, wherein in particular the illumination element is designed ring-shaped and/or star-shaped. As a function of the emblem, the illumination element can comprise further geometrical forms. The colour of the illumination states can likewise be distinct, which means that the first illumination state can have a first colour and the second illumination state a second colour.

In addition it can be provided according to the invention that according to d) in the case that a user is detected in the actuation region the sensor system is suitable for switching on the illumination element in a third illumination state, which differs from the first and/or second illumination state. In the case that the user has now indicated his usage intention in the form of a defined body movement or hand movement on the actuation region, in particular on the illumination element, it is conceivable that the illumination element assumes the third illumination state. The third illumination state can be an indication signal to the user that for example the relevant function on the motor vehicle is executed, which means that for example the motor vehicle door or the boot lid opens automatically.

It is conceivable that the illumination element emits visible light in order to create the actuation region. In this case, the actuation region is located on the illumination element or near the illumination element or in the immediate vicinity of the emblem. Alternatively it is likewise conceivable that a display element is provided in order to let the actuation region be created, wherein in particular the actuation region is visible to the user. The display element can be designed in order to create the visible actuation region on the ground surface. It is likewise conceivable that multiple actuation regions are present and in each actuation region the user has to indicate the user intention so that the user intention is detected and the operating signal is provided.

Preferentially, in the step d), the user intention is detected by a predefined movement. The predefined movement can be the movement of a part of the body of the user in or on the actuation regions, in particular on the illumination element. The predefined action can, additionally or alternatively, be the movement of a part of the body of the user in the actuation region and/or out of the actuation region. The part of the body can be a foot, a hand of the user or the entire user. It can also be that the predefined movement is fixed more precisely, for example that the predefined movement corresponds to a predetermined gesture.

Preferentially, the detection of the user intention has to take place in the step d), the predefined movement within an actuation duration b). When the predefined movement takes place after the actuation duration b), an operating signal is provided. Otherwise, no operating signal for the motor vehicle is triggered in order to trigger a defined function on the motor vehicle.

The optical sensor system is configured in such a manner that during the monitoring of the detection region and/or of the actuation region a measurement of the distance of the user from the sensor system is carried out in order to be able to detect the movement in the detection region and/or in the actuation region. This means that the user in the detection region and/or in the actuation region is detected only when the object or the user in the detection region and/or the actuation region approaches the sensor system and/or the motor vehicle. This means that merely a pure movement of the object in the detection region and/or in the actuation region is not adequate for triggering the signal for starting the authentication check or the provision of the operating signal. Only when the distance of the user to the sensor system and/or to the motor vehicle changes, will a signal according to step b) or step d) be triggered. For this purpose, the distance of the user to the optical sensor is measured by way of at least two images, in particular detection images, which are chronologically recorded consecutively. For measuring the distance, a time of flight measurement can be carried out. The requirements for detecting a user in step b) and step d), i.e. the detection duration, the size of the object, the movement of the object, the approaching of the object can be combined in any way. Accordingly it can be that the object or the user is to have a predetermined size and has to approach the optical sensor in order to be detected as user and trigger a signal for the start of an authentication check or a triggering of an operating signal.

The emblem can be formed for example by being installed in such a manner that the detection region is located at least partially above a ground surface, on which the motor vehicle stands, by way of which the detection region is not restricted to only a small part region of a ground surface in front of a motor vehicle. It can be that the detection region starts near the vehicle above the ground surface and then extends obliquely until the ground surface is reached. Here, the detection region ends on the ground surface. Alternatively, the detection region can end at least partly above the ground surface. In a particular embodiment, the detection region is located entirely above the ground surface. An end of the detection region in this case can result through insufficient light intensity, with which the detection region is illuminated, at a certain distance from the sensor system.

Preferentially, the detection region, in a top view, can diminish towards the optical sensor system. Because of this, only users are specifically detected which will probably approach the sensor system and/or the motor vehicle.

It can be provided that the emblem is designed for arrangement on the motor vehicle rear, for example in a boot lid. Alternatively or additionally the emblem can be suitable for being attached also to a vehicle side, for example in a B-pillar. Because of this, different detection regions, in which a user usually approaches the motor vehicle, can be monitored with the sensor system.

In particular, the detection region can be formed by overlaying a transmission range of the light module and a reception range of the optical sensor. The transmission range of the light module is obtained from the range in which the light module emits light of adequate intensity. The reception range is obtained from the range from which the optical sensor can receive light. The transmission range of the light module can be composed of the transmission ranges of the individual light sources. Alternatively, the transmission range can be restricted to the overlay of the transmission ranges of the individual light sources.

The sensor system, furthermore, comprises the control unit for evaluating the optical sensor. The control unit can be designed in order to evaluate images which were recorded by the optical sensor. These can be images of the detection region and/or the actuation region.

It can be provided that the optical sensor comprises an infrared filter and/or a polarisation filter. At least a part of an interference light can thereby be filtered out. The interference light can for example be sunlight or light of an artificial light source, for example garage light. The light module can likewise comprise a polarisation filter.

It can be that the sensor system is designed to take detection images and comparison images and to evaluate these as applicable. Detection images are created with the help of the reflection of the emitted light of the light modules. Comparison images are created only with the help of the interference light. For the creation of the comparison images, the light module does not emit any light. The monitoring unit or the control unit can detect the interference light by comparing a detection image and a comparison image. The control unit can thereby generate a modified detection image from which the interference light is removed. The sensor system can be designed so that in each case after a predetermined number of detection images a comparison image is recorded.

Advantageously, the light module and/or the light source has a distance a) to the optical sensor. Preferentially, the distance a) is selected small. Accordingly, it can be that the distance a) is in a range from 0 cm≤a≤5 cm, preferably 1 cm≤a≤3 cm, particularly preferably a≈2 cm. Because of this it is possible that preferably many light rays of the light module do in fact reach the reception region of the optical sensor, so that the light module has to emit light of a low intensity. Because of this, the light module has to consume less electrical power.

It can be that the sensor system can be switched between a rest mode and an operating mode. Because of this, the sensor system can require less electrical power in the rest mode than in the operating mode.

It is likewise conceivable to select the resolution of the optical sensor low. Accordingly, an optical sensor can be selected which comprises only a pixel number which can be emitted by a desired object, for example a user or a part of a body of a user, in the detection range with a minimum of only two pixels. The part of the body can be a hand or a foot of a user. For example, the image sensor of the optical sensor can comprise between 500 and 1,500 pixels. Electrical power can also be saved by using the described LDPD sensor, since the LDPD sensor is suitable for use with low light intensity, so that a light module with low electrical power can also be used.

Alternatively or additionally it is conceivable that the control unit is designed, in step b) and/or in step d) to evaluate, during the monitoring of the detection region and/or the actuation region, only a part of the image recorded by the optical sensor. As a result of this, the control unit needs less electrical power. The control unit evaluates in particular only a number of pixels which is lower than the number of the total pixels. The evaluated pixels can be evenly distributed over the image sensor. For example, only each n-pixel can be evaluated with 2≤n≤30. In particular, only every second pixel can be evaluated. The only partial evaluation of the optical sensor can take place in particular only at times. In particular, the only partial evaluation of the optical sensor can take place in the rest mode. Likewise, energy can be saved by selecting a large time span. Accordingly it is conceivable that in the rest mode the time span t is selected greater than in the operating mode. This means that the image frequency in the rest mode is lower than in the operating mode.

The light that is emitted by the light module can be pulsed. It is conceivable that the pulse frequency in the rest mode is lower than in the operating mode. By way of the pulsed light, a change in distance in the detection region and/or in the working region can be determined particularly effectively. At the same time, substantial energy can thereby be saved. Step b) also comprises the detection of a user. Generally, a one-off detection of any object in the detection region can be sufficient in order to detect a user and trigger the signal for starting the authentication check. In order to achieve that the signal for starting the authentication check is triggered only rarely and electrical power thus saved it is possible to make particular requirements on the detection of a user with regard to the detection region.

Accordingly it is conceivable that in the step b) a user in the detection region is only detected when an object is present in the detection region for a predetermined duration d. Even by the selection of the time span t, objects, which are present in the detection region for a shorter time than the time span t could not be detected under certain conditions. However it can also be that the detection duration d is selected greater than the time span t. For example, d with 0.5 s≤d≤10 s, preferably 1 s≤d≤5 s can be selected. Because of this, objects which only briefly cross the detection region can be not detected as user. Accordingly, no authentication check is thus effectively started either. Energy can thus be saved.

It can be provided, furthermore, that in the step b) a user in the detection region is only detected when an object of a predetermined size is present in the detection region. Here, the number of pixels which in the optical sensor prove the presence of the object has to reach for example a predetermined minimum number. This minimum number and/or the predetermined size can be stored in the control unit. The size can correspond for example to the size of an adult person.

It is conceivable, furthermore, that in the step b) a user is detected in the detection region only when the object moves in the detection region. To this end, for example the pixels which depict the light of at least two images recorded chronologically in succession, in particular detection images, can be compared. Additionally or alternatively, for example a distance of the object to the optical sensor with at least two images that were recorded chronologically in succession, in particular detection images, can be measured. If different distances are detected, the object has moved in the detection region. In order to be able to determine a distance of the object to the optical sensor, a time of flight measurement can be carried out for example. When doing so, one or more light pulses are emitted for example and the time taken by the pulse to the object and from there to the optical sensor, measured. Here, the time is directly proportional to the distance of the object.

Advantageously, the sensor system can be designed in such a manner that the detection region is divided into at least two zones, into a near zone and into a distant zone, wherein the near zone has a shorter distance to the sensor system than the distant zone, wherein advantageously a detection of the user according to step b) takes place only when the user is present in the near zone. The near zone is situated at a shorter distance to the sensor system than the distant zone. A boundary of the near zone to the distant zone can be provided at a distance z to the sensor system. For example, z is 0.5 to 2 m. Advantageously, z≈0.6 m. It is conceivable that detecting the user according to step b) can take place only when the user is present in the near zone. In particular, at least one requirement in detecting of the user according to step b) is only checked in the near zone. In particular, only in the near zone is a check whether the object approaches the optical sensor and/or the motor vehicle carried out. It can be that in the distant zone a requirement regarding the detecting of the user according to step b) is checked. For example, the size of the object in the distant zone can be checked. In particular, it can be a requirement other than that which is checked in the near zone. Preferably, a requirement in the distant zone is selected which requires less electrical power than the requirement in the near zone. It can be that a measurement of the distance of the object to the sensor system is carried out only in the near zone. Through this division, electrical power can likewise be saved. It is conceivable that the sensor system is in the rest mode when an object is present in the distant zone and is in the operating mode when an object is present in the near zone.

It can likewise be advantageous to lower the electrical energy per light source and/or light pulse. Accordingly, multiple light sources can be present in the light module. It can likewise be that multiple light pulses in succession can be emitted by the light module in order to be able to generate an image. The light pulses can be integrated or summed up in order to generate the image. Because of this, the electrical power per light pulse can be lowered. In order to be able to carry out a distance measurement in this case a certain time interval for recording the image is preset. The total intensity of the light pulses received in the time interval is correlated with the distance.

Advantageously, the light module and/or the sensor can comprise a lens system wherein in particular the lens system comprises a filter and/or the sensor system comprises a rigid lens system. It is particularly advantageous that a lens system is used for the detection region and for the actuation region.

In addition, the emblem according to the invention can be arranged in a receptacle which is formed for the mounting of the emblem on the motor vehicle, and/or that the emblem comprises a plurality of independent fields, wherein in each case in a field, one of the following components is arranged: light module, display element, optical sensor, illumination element. It is additionally conceivable that the emblem is designed with a shielding so that no unnecessary interference lights influence the functioning of the optical sensor system.

Advantageously, the emblem or the receptacle can be suitable for being fastened to the motor vehicle rear or to a motor vehicle side, in particular, the emblem can be moveable. It is conceivable for example that following a positive authentication check the emblem is suitably moved, namely out of a first position into a second position, wherein in the second position the actuation range is visualised via the display element or via the illumination element.

The operating signal can be a signal for opening and/or closing a moveable part of the motor vehicle. Alternatively or additionally, the operating signal can be unlocking and/or locking of the moveable part. In addition it is conceivable that further functions can be triggered via the operating signal, for example:

opening and/or closing the side door of the motor vehicle,
opening and/or closing a window of the motor vehicle,
opening and/or closing the engine bonnet of the motor vehicle,
opening and/or closing the tank lid of the motor vehicle,
switching on and/or switching off an independent heater of the motor vehicle,
switching on and/or switching off a window heater of the motor vehicle,
switching on and/or switching off a light function of the motor vehicle,
folding-in and/or folding-out the outside mirrors of the motor vehicle,
switching on and/or switching off an alarm system of the motor vehicle,
adjusting a user-specific setting in the motor vehicle, in particular the seat setting of the driver's seat,
retracting and/or extending a trailer coupling.

It can be provided that the optical sensor system or the entire assembly module is designed for arrangement on the vehicle rear, for example behind the rear window, in a handle strip, in an emblem, in a back light, behind a reflector, on a bumper and/or in a gap between two components. Alternatively or additionally, the assembly module can be suitable for being fastened to a vehicle side, for example in a B-pillar. Because of this, different detection regions in which a user usually approaches the motor vehicle, can be monitored with the optical sensor system. In particular, the optical sensor system or the entire assembly module can be concealed behind a layer that is not transparent from the outside, but which is light-permeable to light of the optical sensor system. Accordingly, the bumper for example, on which the optical sensor system is mounted, can be painted.

Preferably, the optical sensor system is arranged on the vehicle in such a manner that it does not get dirty easily. For example, the optical sensor system can be arranged behind the back window in the wiping region of the windscreen wiper or in the handle strip. Alternatively or additionally, the assembly module can comprise a washing nozzle with which the optical sensor system can be cleaned. Here, the washing nozzle can for example automatically clean the optical sensor system, when also the wiper of the windshield and/or back window is actuated. A clean optical sensor system requires a lower light intensity for functioning, so that energy can thus also be saved.

The intensity of the emitted light can depend on the brightness of the ambient light. The brightness of the ambient light can be determined by a brightness sensor.

If during the monitoring of the actuation region different user intentions can be determined, different gestures can be assigned to different user intentions. Accordingly, for example, stepping into the actuation region with a foot can cause the boot lid to open, while a lateral movement of a hand near the optical sensor causes the trailer coupling to be extended.

It is conceivable that removing the object has to take place within a predetermined removal duration from the actuation region for the signal to be provided. The removing of an object within a predetermined removal duration can be part of the gesture. The start of the removal duration is perceptible to the user. Accordingly, for example a display element can assume multiple illumination states. In one of the illumination states, such a display element can emit light of a constant brightness. In another illumination state, the brightness for example can change periodically. Accordingly, for example at the start of the actuation duration, the display element can emit light of constant brightness. During the removal duration, the display element can for example flash. Only when the object, in particular a part of the body of the user, is removed from the actuation region within the removal duration, will the signal be provided.

It can be provided that the assembly module and/or motor vehicle comprises at least one means facilitating the user to indicate his intention in the actuation region, so that the signal is triggered.

Accordingly, the assembly module can emit an information signal that the actuation duration will come to an end shortly. The information signal can start for example by a change of the illumination state of the display element. The information signal can correspond to another illumination state of the display element. For example, the display element can flash towards the end of the actuation duration. The means corresponds to a corresponding method default in the monitoring unit.

It can be likewise helpful to the user for indicating his intention when the user is guided to the actuation region. This is the case in particular when the user, carrying a large object, is unable to perceive the end surface of the actuation region on the ground surface. To this end, the assembly module and/or the motor vehicle can comprise means through which a signal that is perceptible, in particular visible, audible or palpable by the user can be generated. Accordingly, the assembly module for example can comprise illumination elements, for example LEDs. The illumination elements can be arranged so that the illumination elements function as guide posts. For example, the illumination elements can be orientated in such a manner that they generate markings on the ground surface which lead towards the actuation region. Additionally or alternatively, the illumination elements can be arranged next to one another. The illumination elements can be switched on in an order which shows the user the direction in which he has to move towards the actuation region. Instead of the illumination elements, existing light elements which are arranged next to one another in the motor vehicle, for example the light elements of a headlight, of a brake light, indicators or the like can also be used for this purpose. It is likewise conceivable to audibly instruct the user acoustically in which direction the user should move. To this end, the assembly module can comprise a loudspeaker. It is likewise conceivable to impart the directional change to the Id-transmitter, which shows the user the way by way of different vibrations. When the user is informed of a directional change, the optical sensor system determines the position of the user and the direction in which he should move to the actuation region and causes the perceptible means to emit the corresponding signal.

Likewise it can be helpful to the user that the position of the actuation region and/or the length of the actuation duration is variable. This is particularly helpful when a bodily impaired user wishes to indicate his intention. This is likewise helpful when the actuation region is arranged in a position that is unfavourable to the user. The unfavourable position in this case can be permanent. For example, the actuation region can terminate on a trailer coupling. Alternatively, the unfavourable position can be unfavourable only for triggering a one-off operating signal, for example since the actuation region terminates at a puddle. In order to change the position of the actuation region and/or the length of the actuation duration, an in particular predefined user action can be provided. Accordingly, the user can change for example the position of the actuation region and/or length of the actuation duration by way of an input in a user menu, for example a motor vehicle control unit or an Id-transmitter. Alternatively, the predefined user action can be detected by the optical sensor system. In a further alternative, the assembly module can be transferred into a learning mode, in which the assembly module learns the changed position of the actuation region and/or the changed length of the actuation region.

It can likewise be helpful to the user that the actuation region is again monitored in order to determine a user intention for triggering an operating signal, once a first actuation duration has expired without detecting a user intention. This is helpful in particular when the user was distracted and has not timeously reached the actuation region or made the wrong gesture. For this reason it can be provided that the actuation region can be monitored multiple times, in particular twice or thrice in succession. The renewed monitoring of the actuation region can be initiated automatically. Alternatively, a predefined user action can be provided in order to again monitor the actuation region for a further actuation duration. To this end, a capacitive sensor can for example be triggered by the user. Alternatively it can be a predefined user action that is detected by the optical sensor system.

The predefined user action, which is detected by the optical sensor system and which causes a change of the position of the actuation region and/or the actuation duration and/or a renewed monitoring of the actuation region for detecting a user intention can for example be the following user actions: a predetermined gesture within the actuation and/or detection region, for example a moving of a part of the body of the user to and fro, a non-removal of the body part, provided removal was intended, a movement of the user in the detection and/or actuation region and/or out of the detection and/or actuation region. In particular, the part of the body can be a hand or a foot. It can be provided, furthermore, that the user leaves the detection region for a predetermined period of time and then returns into the detection region.

When the actuation region is again monitored for detecting a user intention, this is also indicated by the display element. When the position of the actuation region is changed, this is indicated by the display element. For this purpose, the display element comprises multiple illuminants, for example LEDs. One or multiple illuminants, in each case, render an actuation region at least partially visible in each case. Preferentially, the actuation region with the changed position lies within the detection region. Depending on which actuation region is monitored, the corresponding pixels are evaluated.

It can be that a position of the Id-transmitter is checked during or after authentication and prior to triggering the signal. For this purpose, the strength of a signal emitted by an Id-transmitter can be used. For example, the receive signal strength indicator (RSSI) can be used for this purpose. By determining the strength of the emitted signal it can be determined for example if the user is located in front of or next to or behind the motor vehicle. It can thereby be ensured that only the authorised user himself enters the detection region and has indicated his user intention in the actuation region. It is conceivable to cyclically query the RSSI.

Energy can likewise be saved by light of different wavelengths. Accordingly, monitoring the detection region up to the one-off detection of any object in the detection region can take place with light of a longer wavelength than the subsequent verification of further requirements, which are imposed on the detecting of a user. Accordingly, light of a wavelength of 905 nm can be initially used for example. When an object is detected in the detection region, light of a wavelength of 800 nm can be used for example. Alternatively, the wavelength can shorten the object changes from the distant into the near zone.

The object of the invention is also solved through a method for triggering an operating signal for a motor vehicle with an emblem comprising a sensor system, wherein the sensor system carries out the following steps:
  a) monitoring a detection region lying outside the vehicle,
  b) in the case of a detecting of a user in the detection region, triggering a signal for starting an authentication check between an Id-transmitter and the motor vehicle,
  c) monitoring an actuation region lying outside the vehicle which differs from the detection region,
  d) in the case of a detecting of a user in the detection region, providing the operating signal for the vehicle.

Preferably, the method according to the invention is a method that can be carried out with the emblem as described before. In particular, the authentication can be a passive keyless entry verification. In the following, some points which are substantial to the invention are presented again, wherein for more concise explanations reference is made to the description regarding the emblem according to the invention, which likewise apply to the method according to the invention.

Advantageously, an illumination element that is arranged on the sensor system following a positive authentication according to b) is operated in a first illumination state. In addition it is conceivable that according to c) the illumination element is operated in a second illumination state which differs from the first illumination state. Likewise, the invention can provide that according to step d), the illumination element is operated in a third illumination state, which differs from the first and/or second illumination state, wherein in particular an opening operation of a moveable part of the motor vehicle is carried out. The different illumination states offer the user information content in order to accordingly carry out an intention for providing the operating signal for the motor vehicle.

According to the invention, the detection region is divided into at least two zones, into a near zone and a distance zone, wherein the near zone lies at a shorter distance to the sensor system than the distant zone, wherein detecting the user according to step b) takes place only in particular when the user is located in the near zone, in particular the detection region is continuously monitored and/or step b) takes place, when the user is located in the near zone. This means that detection region is continuously monitored with the parked-off motor vehicle up to a successful authentication. Here, the sensor system can be evaluated during this monitoring after each predetermined time span t.

The method according to the invention can provide that detecting the user according to step c) or d) requires a defined gesture and/or action of the user. In addition, the method according to the invention can advantageously provide that the providing of the operating signal according to step d) takes place only when the illumination element is operated in the first or in the second illumination state, in particular that the first and/or the second illumination state is only operated in a defined time during the step c).

In a possible configuration of the method according to the invention, step c) can take place within a defined time window, in particular when no gesture and/or action of the user has taken place within the defined time window, the step d) is not carried out. According to the invention, the sensor system emits light in the range that is not visible to the user, in particular the sensor system emits pulsed light. Furthermore, the method according to the invention can provide a display element which emits light in the visible range for the step c) in order to create an actuation region for the user, in particular that the actuation region lies in the detection region. In addition, the sensor system can comprise a sensor which receives the light out of the detection region and/or actuation region, wherein the sensor system comprises a monitoring unit which evaluates the data of the sensor.

In a measure improving the invention, the sensor system can comprise a light module which emits the light so that a transmission region is created, wherein the sensor comprises a receiving region, which at least partially overlaps the transmission region, wherein the region of the overlap forms the detection region. It can be that the sensor system can switch to a rest mode and an operating mode. In the rest mode, the image frequency can be lower than in the operating mode. The light emitted by the light module can be pulsed. It is conceivable that the pulse frequency in the rest mode is lower than in the operating mode. It can likewise be that multiple light pulses are emitted by the light module in succession in order to be able to generate an image. The light pulses are integrated and/or added up in order to generate the image.

Likewise, the control unit in step a) and step c) during the monitoring of the detection region and/or of the actuation region can evaluate only a part of the image recorded by the optical sensor. Energy can be saved because of this.

In order to be able to more precisely decide that a user approaches the motor vehicle it can be advantageous that the sensor system carries out a check of a distance change in order to detect a user in the detection region and/or in the actuation region which approaches the motor vehicle, in particular that the sensor system carries out a check of a distance change only when the user is located in the near zone. It can thereby be effectively prevented that for example an authentication check is not started when merely the user walks past his motor vehicle and does not intend to trigger any function on the motor vehicle.

Advantageously, the sensor system can receive and/or take images of the detection region and/or of the image region, wherein the images are pulsed images and non-pulsed images, wherein the pulsed images are created through the reflection of the emitted, pulsed light of the sensor system and the non-pulsed images are created through the light of the detection region and/or actuation region, and that in particular for the checking of a distance change the pulsed images can be compared with the non-pulsed images. A distance change of the user can thereby be efficiently detected with a low expenditure of energy. This means that the sensor system is set so that only defined movements of the user in the detection region and/or in the actuation region ultimately trigger a triggering of the operating signal or a start of the authentication check.

The method according to the invention can be operated among other things in a low-energy manner in that the sensor system is switched in the rest mode until the user reaches the near zone, in particular that the pulse frequency of the emitted light in the rest mode is lower than in the operating mode.

According to the invention, the Id-transmitter during the step b) transmits an authentication code to an access control system of the motor vehicle and the access control system compares the authentication code with a stored code and in the case of an agreement, an unlocking signal is triggered. Furthermore, the invention can provide that step d) takes place only in the case of a defined movement of the user or of a part of a body of the user in/on the actuation region, in particular that the part of the body is a foot or a hand of the user. The provision of the operating signal for the vehicle takes place, which can for example be an automatic opening of the boot lid.

On the one hand, the actuation region can be located nearly on the ground or on the ground surface, wherein the user has to address the actuation region with a suitable intention in order to trigger a corresponding function in the motor vehicle. It is likewise conceivable that the actuation region is located at a distance to the ground and to the sensor system, wherein in particular the actuation region can be located approximately at the same height to the sensor system. For example, the actuation region on the emblem can be positioned at a short distance to the motor vehicle. The actuation region can be formed for example by the illumination element. It is conceivable, for example that the user has to touch the emblem in order to be detected in the actuation region, in order to trigger the operating signal for the motor vehicle.

The light module can additionally be employed as motor vehicle licence plate illumination. The light module is variable in its position on the motor vehicle, wherein it can also be arranged for example on the bumper or in the vicinity of the motor vehicle number plate.

The light module can for example be at least one LED element. Alternatively and/or additionally, the illumination states can differ among other things in that these can flash for different periods of time, for example that in the first illumination state the illumination element emits light continuously, in the second illumination state the illumination element flashes and in the third illumination state the illumination element flashes for a longer period of time, which means that the respective power-on time of the illumination element in the third illumination state is longer than in the second illumination state. Obviously, the invention also comprises further variations of the illumination states which can differ in the respective power-on time duration, the wavelength of the light etc.

It is likewise conceivable that the actuation region, which is projected for example onto the ground surface by the light module can be put into different illumination states such as for example into the first and/or second and/or the third illumination state.

Advantageously, the emblem has a material property that is light-permeable from the motor vehicle side so that monitoring the detection region and/or the actuation region can be reliably carried out. However, from the outside, the observer cannot see through the emblem since the material is suitably formed on the outside.

According to the invention, the emission of non-visible light advantageously takes place by the light module, as a result of which the detection region is created, wherein the detection region is also built up via the light module even during the monitoring of the actuation region. Advantageously, the intensity for the emission of the light by the light module is always the same, in particular in the method step b) and in the method step d). Furthermore, the light module advantageously generates always the same pulsed light signals as already described. The control unit will advantageously always operate with the same, rigid lens system, which means that the same detection region is evaluated both during the checking of the detection region and also of the actuation region. Advantageously however, a lower pixel region is evaluated in the actuation region. Energy can be saved because of this.

It is particularly advantageous that a fixed detection region is monitored by the sensor system. In addition there is an actuation region in the detection region which serves for triggering at least one function on the motor vehicle. Since the method according to the invention or the device according to the invention operates in a highly energy-saving manner, the detection region can be permanently monitored. In the case of the actuation region on the ground or on the ground surface it can be necessary according to the invention that the foot needs to be actuated on the actuation region only for a short period of time in order to trigger a function. It is also conceivable that for example multiple actuation fields are arranged in the boot lid region onto which the user for at least a short time has to place both feet in order to trigger further functions.

The light module can for example pulse or flash laser light in order to create the detection region, as a result of which the actuation region can also be monitored. By way of the pulsing, an exact distance measurement of an object within the detection region and/or the actuation region can be achieved.

It can be particularly advantageous that the sensor system is at least partially an optical sensor system which comprises an optical sensor and a non-optical sensor, wherein the non-optical sensor is a proximity sensor or a tactile sensor or a capacitive sensor, wherein in particular the non-optical sensor monitors the detection region and the optical sensor the actuation region. It can likewise be also included according to the invention that the step b) starts only in particular when the non-optical sensor detects a defined first action of the user, in particular the optical sensor is activated, in order to monitor the actuation region according to step c) and the operating signal is provided only according to step d) when a second action of the user takes place.

Alternatively and/or additionally, a protection query can be integrated for example which interrupts and/or disables the step a) at least for a certain period of time when a certain number of first actions was detected which does not correspond to the defined action, in order to carry out step c).

Figure 4:
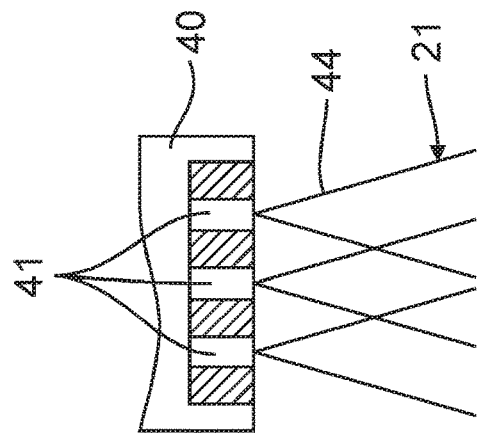
Figure 3:
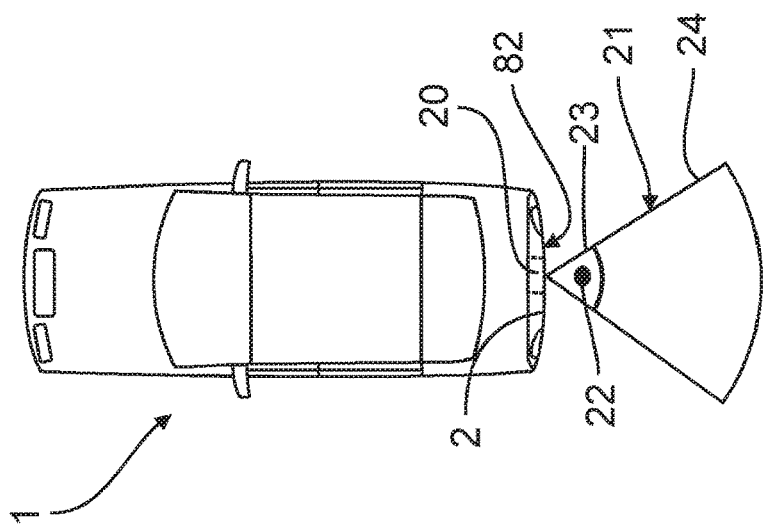
Figure 2:
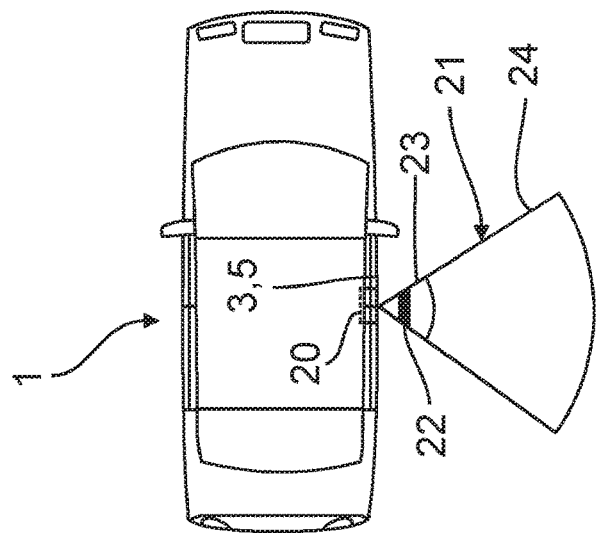
Figure 6:
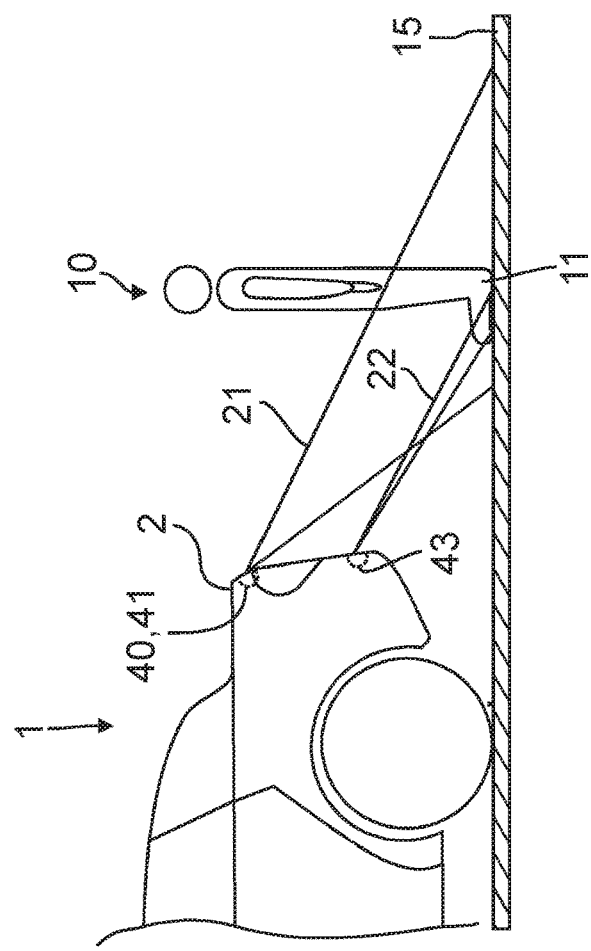
Figure 5:
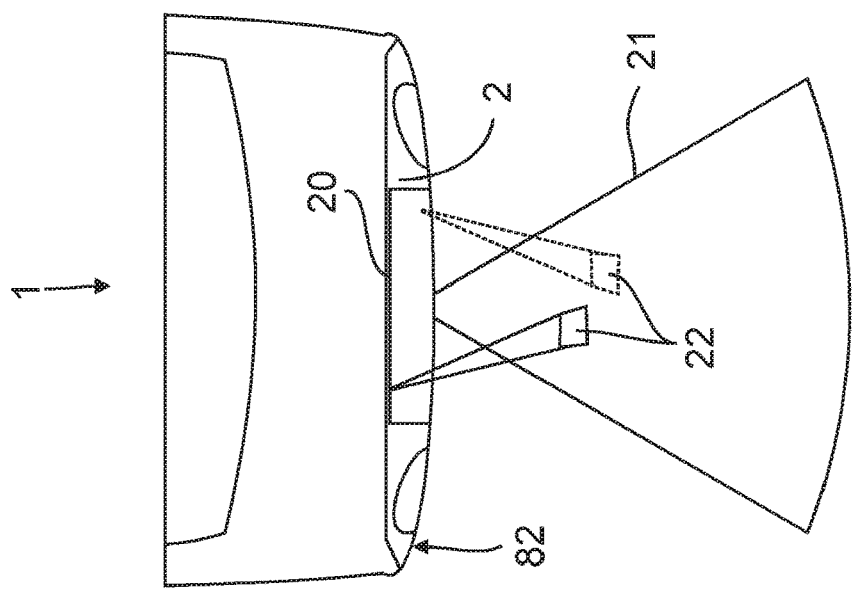
Figure 13:
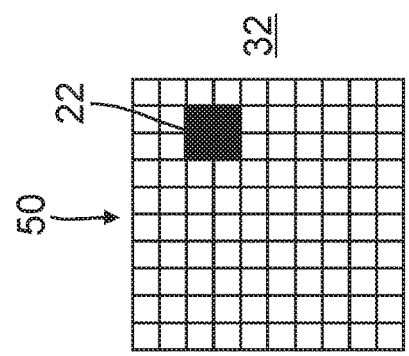
Figure 12:
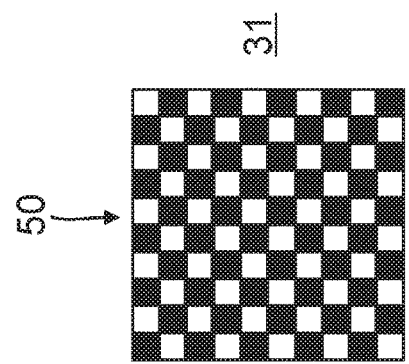
Figure 11:
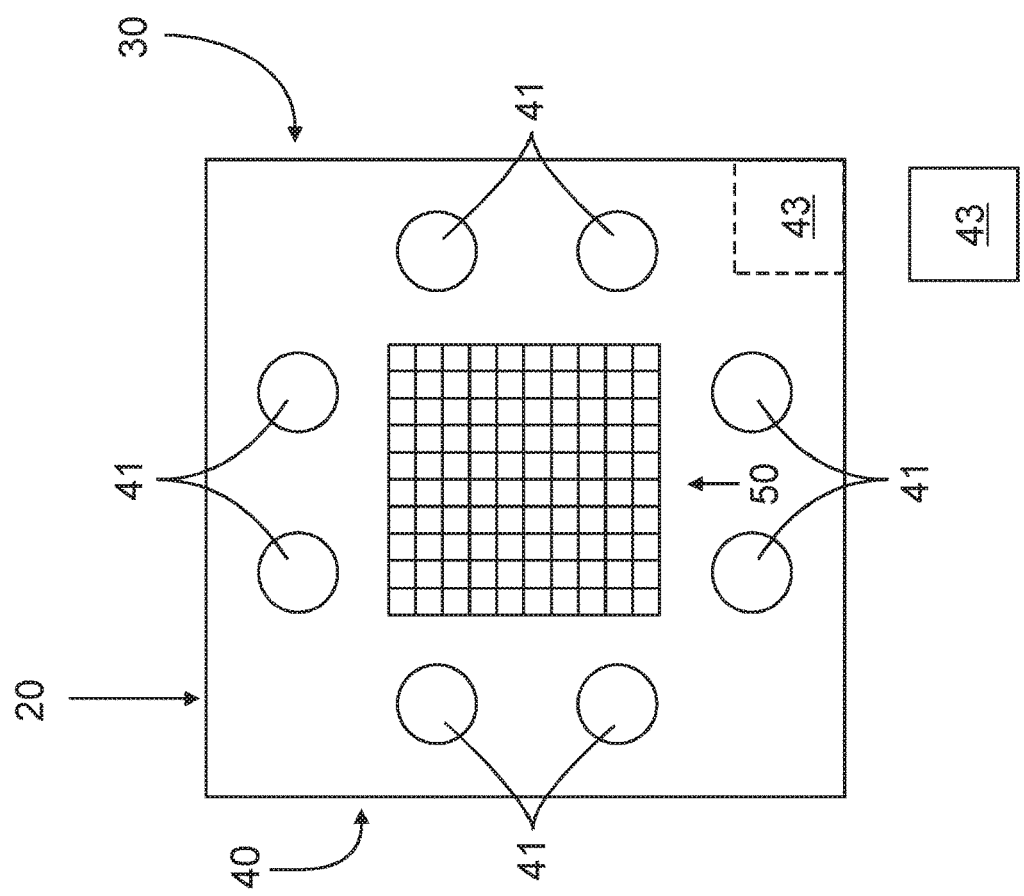
Figure 14:
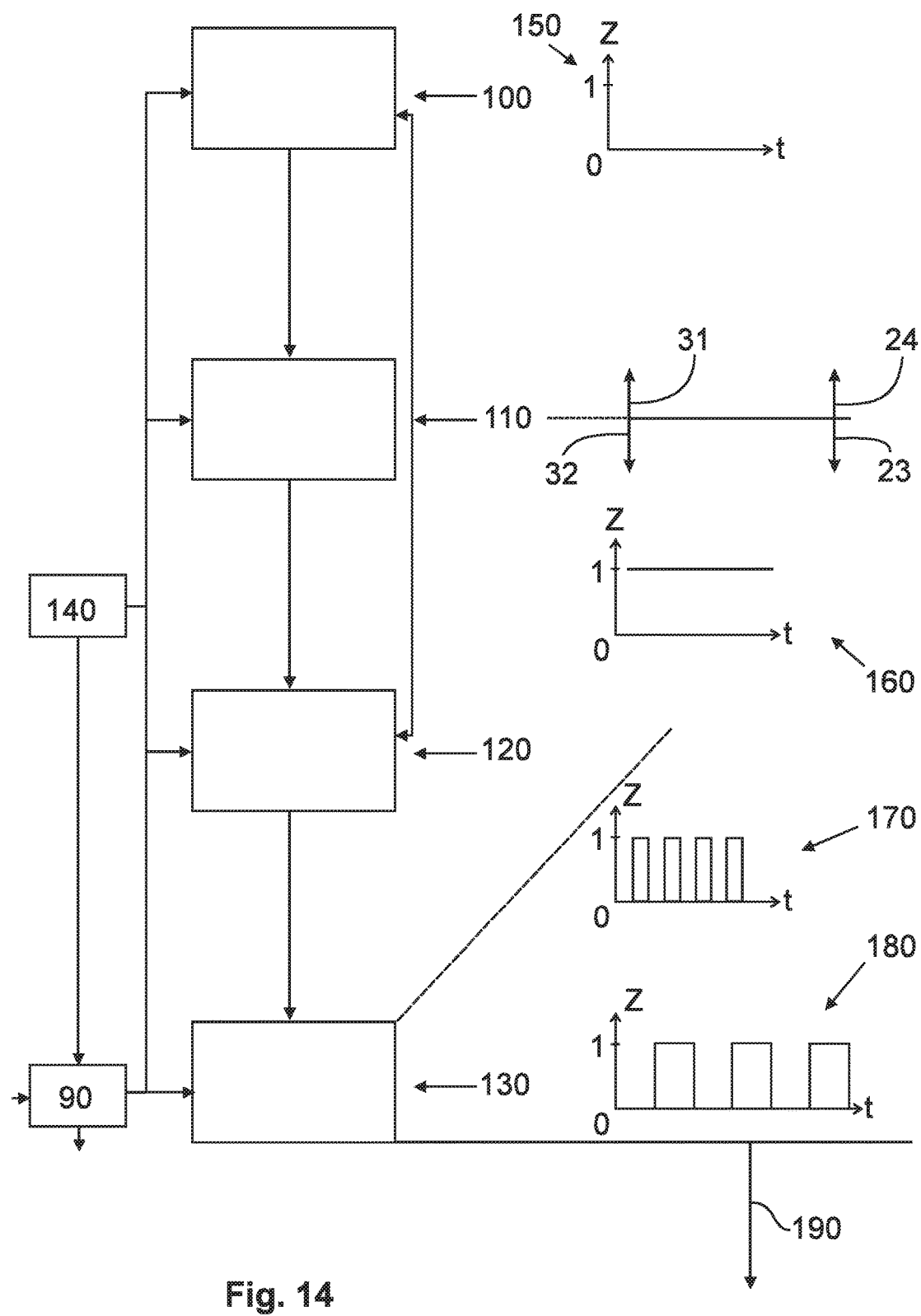
Figure 16:
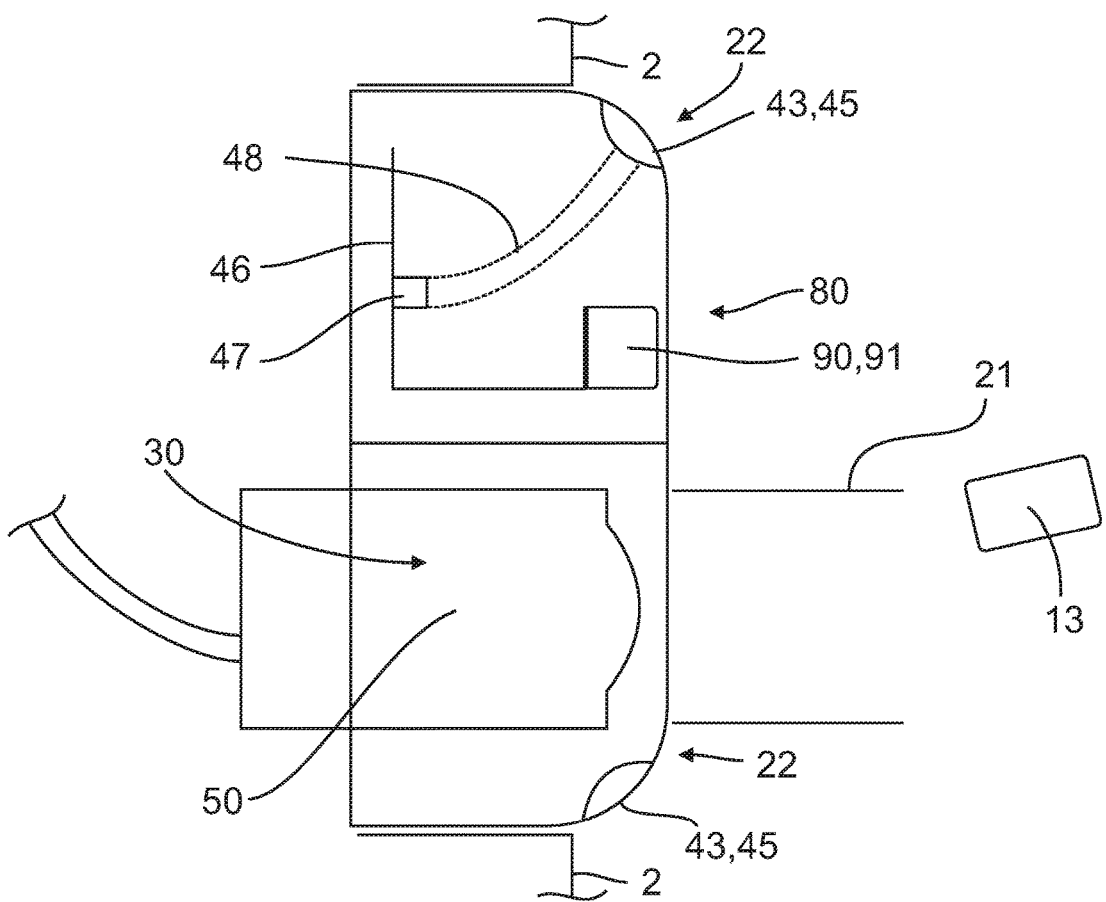
Figure 17:
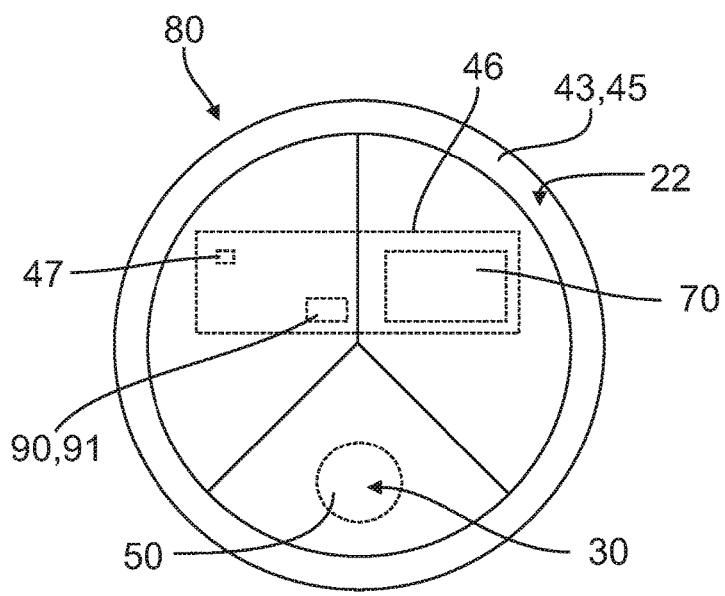
Figure 18:
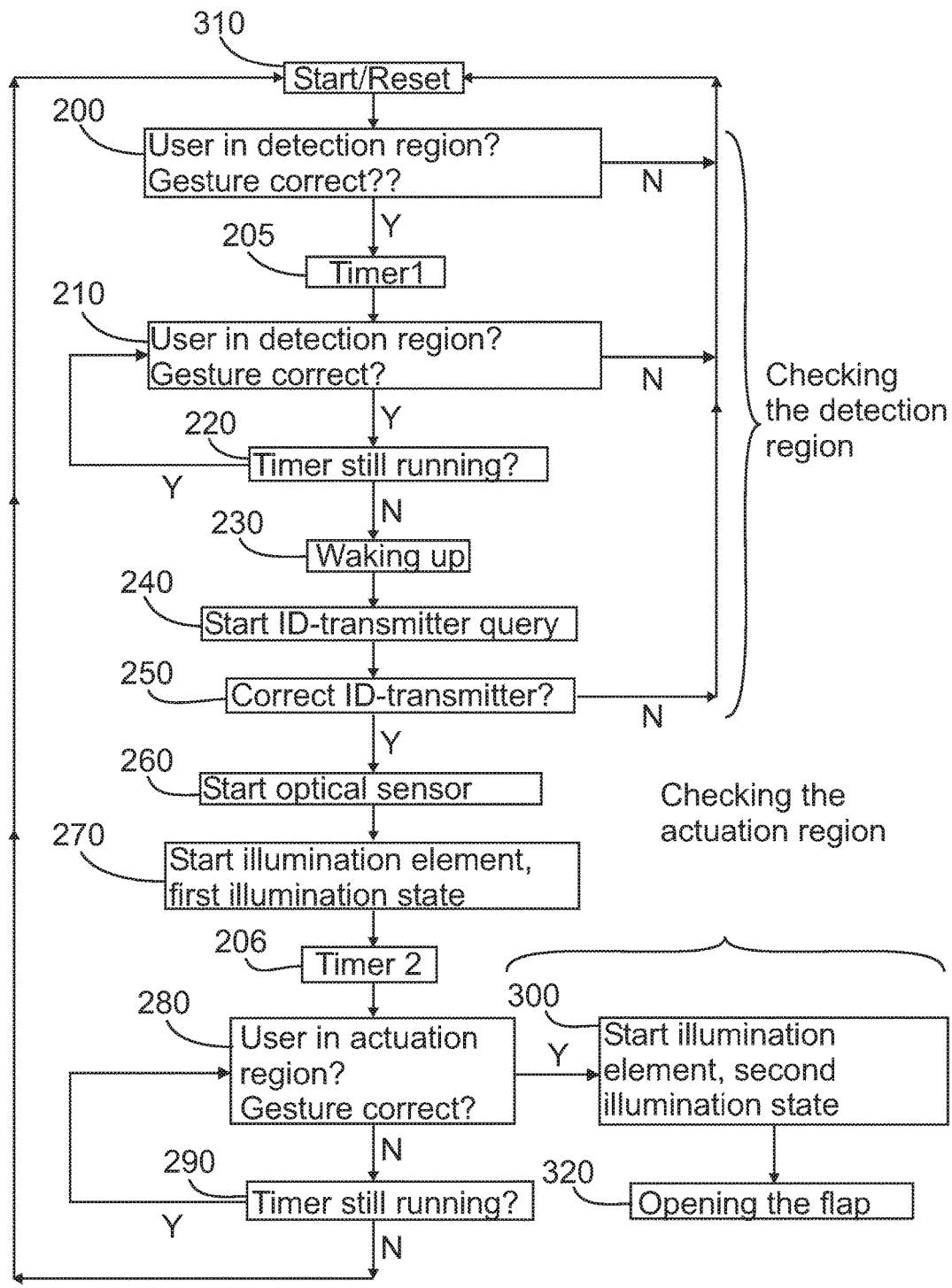
Figure 19:
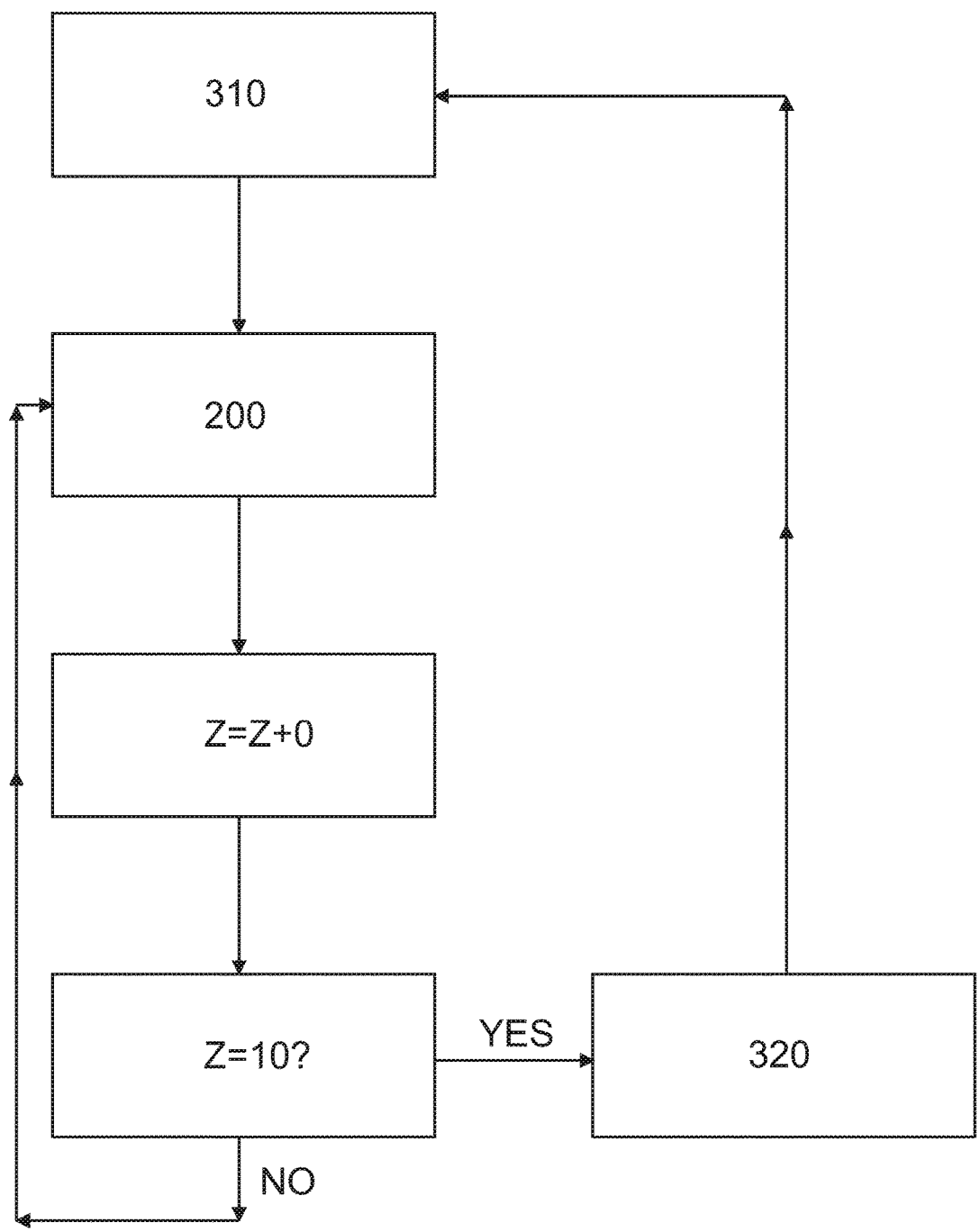

Further measures which improve the invention are obtained from the following description concerning the exemplary embodiments of the invention, which are schematically shown in the figures. All features or advantages arising from the claims, the description or drawings including design details, spatial arrangement and method steps can be substantial to the invention both by themselves as well as in various combinations. It shows:

FIG. 1 a schematic view of an assembly module for a motor vehicle with a sensor system, which monitors a detection region and an actuation region, FIG. 2 a schematic top view of a motor vehicle, which is equipped with a sensor system according to FIG. 1, FIG. 3 a schematic top view of a motor vehicle with a sensor system according to FIG. 1, FIG. 4 a schematic representation with respect to a light module of a sensor system, FIG. 5 a top view of a motor vehicle, which comprises an assembly module with a sensor system, FIG. 6 a lateral view of the motor vehicle according to FIG. 5, FIG. 7 a further view of a motor vehicle with an assembly module according to FIG. 1, FIG. 8 a further exemplary embodiment of an assembly module with a sensor system for monitoring a detection region and an actuation region, FIG. 9 an exemplary embodiment of a motor vehicle emblem, in which a sensor system for monitoring a detection region and an actuation region is integrated, FIG. 10 a representation of the radiation intensity over the time, which is emitted from a sensor system for monitoring the detection region and/or the actuation region, FIG. 11 a schematic view of an optical sensor of the sensor system, FIG. 12 a representation of the optical sensor according to FIG. 11, which is operated in an evaluation mode, FIG. 13 the optical sensor according to FIG. 12, which is operated in a second evaluation mode, FIG. 14 a possible method sequence, which an assembly module according to FIG. 1 to FIG. 13 can operate, FIG. 15 a schematic representation of the sensor system, which carries out a check of a distance change, FIG. 16 a schematic view of an assembly module, in particular of an emblem with an optical sensor system, FIG. 17 the assembly module according to FIG. 16 in a further view, FIG. 18 a further method sequence according to a further exemplary embodiment, which an assembly module for example according to FIG. 16 can operate, FIG. 19 a further method version according to FIG. 18.

FIGS. 1, 16 show an assembly module 20 which can be employed in a motor vehicle 1. The assembly module 20 comprises a sensor system 30 which is suitable for monitoring the near surroundings of the motor vehicle 1. The assembly module 20 is electronically connected to a motor vehicle electronic system which is integrated in the motor vehicle 1, wherein via a detection of a user 10 an operating signal for the motor vehicle 1 can be generated in order to trigger for example an unlocking and/or a locking and/or opening and/or closing of a moveable part 2, 3 of the motor vehicle 1. The moveable part 2, 3 can for example be a boot lid 2 or a side door 3 or a sliding door 3. For example, it can be an optical sensor system 30.

The optical sensor system 30 comprises an optical sensor 50 and a light module 40, wherein the light module 40 can emit light 44, as a result of which a detection region 21 is created. In addition, the assembly module 20 comprises a display element 43, which can let an actuation region 22 be created. In addition, the light module 40 comprises a plurality of light sources 41, which is schematically shown in FIG. 4 and FIG. 11. In addition, the light module 40 has a distance to the optical sensor 50 which in the present exemplary embodiment can lie in a range d), which lies between 1 cm≤d≤3 cm. The optical sensor 50 is designed in such a manner that light 44 from the detection region 21 and/or from the actuation region 22 is received. In the shown exemplary embodiment, the detection region 21 is not visible for the user 10, wherein the light module 40 is designed in such a manner that the emitted light 44 consists of IR-rays.

The light module 40 according to FIG. 1 can comprise a lens system 42, which for example can be additionally embodied with a filter, which is not explicitly shown. In addition, a control unit 60 is shown in FIG. 1 which is suitable for evaluating data of the sensor 50. In addition, the control unit 60 can take over further functions, which will still be discussed in the following. Advantageously, the control unit 60 is integrated within the assembly module 20. It can likewise be conceivable that the control unit 60 is arranged on the motor vehicle side, wherein an electronic connection exists between control unit and assembly module 20 or the optical sensor system 30.

The assembly module 20 according to all exemplary embodiments is arranged in a receptacle 25, which is designed for the mounting of the assembly module 20 on the motor vehicle 1. The assembly module 20 and/or the receptacle 25 are suitable according to all exemplary embodiments to be arranged on the vehicle rear (FIG. 3, FIG. 5, FIG. 6, FIG. 8 and FIG. 16) or on a vehicle side (FIG. 2 and FIG. 7). For example, the assembly module 20 can be attached to the B-pillar 4 of the motor vehicle 1 (see FIG. 7). The invention likewise includes that the assembly module 20 according to the invention is at least partially integrated in the door handle 5, as schematically shown in FIG. 7.

FIG. 1 shows that the assembly module 20 is provided on a handle strip 6 of the motor vehicle 1, wherein the handle strip for example is part of a door handle or of a boot handle. The optical sensor 50 can be additionally equipped with a lens system 51, which is shown in FIG. 1. In FIG. 8 and FIG. 9, the exemplary embodiment is shown in which the assembly module 20 is provided in an emblem 80 of the motor vehicle 1. The light module 40 as well as the display element 43 are orientated in such a manner that the actuation region 22 is substantially smaller than the detection region 21.

In FIG. 8, FIG. 9 and FIG. 16, the optical sensor system 30 additionally comprises an illumination element 45 in order to render different illumination states visible to the user 10, which are exemplarily shown in FIG. 14. The illumination element 45 can also operate as display element 43, which will still be discussed in the following. According to FIG. 9 and FIG. 17, the emblem 80 comprises different fields 81, wherein in a field 81 in each case one of the following components can be arranged: light module 40, display element 43, optical sensor 50. It can likewise be provided that in one of the fields 81 the illumination element 45 can be integrated. In addition it is conceivable within the scope of the invention that the emblem 80 is moveably arranged on the motor vehicle 1. In a first position, the optical sensor system 30 could be located for example protected behind the emblem 80. In a section position it is conceivable that a checking of the detection region 21 and/or of the actuation region 22 can be carried out.

According to FIG. 1 it is conceivable that the display element 43 is arranged on the motor vehicle side and not in the assembly module 20. The display element 43 is electrically connected with the control unit 60. According to FIG. 1 and FIG. 16 it is conceivable, furthermore, to provide an emergency actuation 90 within the assembly module 20, wherein by way of an activation of the emergency actuation 90 with a part of the body 12 of the user 10 an operating signal for the motor vehicle 1 can be provided. This emergency actuation 90 allows the user 10 to trigger the mentioned operating signal for the motor vehicle 1 when the optical sensor system 30 is dirty for example or has a functioning fault. In such a case, the emergency actuation 90 can be activated by the user 10 in order to trigger the operating signal for the motor vehicle 1. Here, the emergency actuation 90 comprises an activation means 91, which can for example be a push button or a switch, while the activation means 91 can function capacitively or inductively or touchless. Likewise, the activation means can be a piezo element. In the case that the sensor system 30 comprises a higher contamination so that the optical sensor system 30 cannot adequately monitor the detection region 21 and/or actuation region 22, the sensor system 30 is capable of being operated with increased power as a result of which a satisfactory monitoring of the detection region 21 and/or of the actuation region 22 is possible.

The optical sensor system 30 according to FIG. 1 can monitor the region lying outside the motor vehicle 1, in particular monitor a detection region 21, wherein the detection region is divided into a near zone 23 and a distant zone 24. The near zone 23 has a shorter distance to the sensor system 30 than the distant zone 24. The sensor system 30 according to the invention continuously monitors the detection region 21, namely even in particular when the user 10 is located outside the detection region 21. The monitoring of the detection region 21 is schematically shown also in FIG. 14 with the reference number 100. When the user 10 now enters the near zone 23 within the detection region 21, a signal for starting an authentication check is now effected between an Id-transmitter 13, which the user carries on him, and the motor vehicle 1, which is schematically shown in FIG. 14 with the reference number 110. When the authentication is positive this means that the user 10 with his Id-transmitter 13 is authorised to provide an operating signal for the motor vehicle 1, the method step 120 according to FIG. 14 takes place, in the case of which an actuation region 22 which is located outside the motor vehicle 1 and which differs from the detection region 21 is monitored. According to all exemplary embodiments, the sensor system 30 emits light in the range that is not visible to the user, as a result of which the detection region 21 is created. Advantageously, the sensor system 30, in particular the light module 40, emits pulsed light. The user 10 can now activate the actuation region 22 by way of a defined movement, gesture etc., which is detected by the sensor system 30. In the case of a detection of the user 10 in the actuation region 22, a provision of the operating signal for the motor vehicle 1 takes place, which is shown in the method step 130 according to FIG. 14.

The assembly module 20 can in data communication with an access control system 14 of the motor vehicle 1, wherein for example a door lock 8 can be suitably addressed via the operating signal so that it can unlock and/or lock in order to for example open or close a boot lid or a door of the motor vehicle 1. The defined gesture of the user 10 in the actuation region 22 can vary. It can be provided, for example, that the user 10 with his foot 11 steps on the visible actuation region (see FIG. 6). According to FIG. 5, a further version is shown in which two actuation regions 22 are visualised, which the user 10 has to activate in order to activate the method step with the reference number 130 according to FIG. 14. It is particularly advantageous that the detection region 21 is continuously monitored in particular even when the user according to FIG. 1 is located outside the detection region 21. According to FIG. 1, the actuation region 22 lies within the detection region 21, wherein during the monitoring of the actuation region 22 the light module 40 continues to emit invisible light, as a result of which the detection region 21 forms, while the optical sensor 50 checks the actuation region 22 at the same time. In the process, the sensor 50 receives light from the detection region 21 and light from the actuation region 22. These data and/or signals are recorded by the image 50, while the control unit 60 performs the evaluation of the data. The control unit 60 can also be integrated in the image sensor, in particular the optical sensor 50.

According to FIG. 4 it is shown that the sensor system 30 according to all exemplary embodiments can emit a plurality of light bundles 44 which combined form the detection region 21. Thus, the light module 40 comprises a plurality of light sources 41, which in each case emit individual light bundles 44 into the outer region of the motor vehicle 1 in order to let the detection region 21 be created. An advantage here is that the light intensity of the individual light sources 41 can be substantially reduced, as a result of which the energy consumption of the optical sensor 30 can be reduced.

In FIG. 15, the sensor system 30 is schematically shown, which in FIG. 1, FIG. 16 and in the remaining exemplary embodiments, can carry out a check of a distance change in order to detect a user 10 in the detection region 21 and/or in the actuation region 22 which user approaches the motor vehicle 1. The light module 40 emits invisible light in the direction of the actuation region 22, which takes the time $t_1$ in order to leave the light module 40 and be received by the optical sensor 50. When a user 10 now approaches the actuation region 22, this is shown in FIG. 15b, the light 44 takes the time $t_2$ in order to get from the light bundle 40 to the optical sensor 50. Accordingly, the method according to the invention receives the valuable information that a user 10 approaches the motor vehicle 1. Advantageously, a distance check is carried out only in particular when the user 10 is located in the near zone 23. Thus, the energy expenditure of the assembly module during the operation can be kept low. According to all exemplary embodiments, the sensor system 30 can receive images of the detection region 21 and of the actuation region 22. The images are advantageously pulsed images and non-pulsed images, wherein the pulsed images are created through a reflection of an emitted, pulsed light 44 of the sensor system 30 and the non-pulsed images are created through the light of the detection region 21 and of the actuation region 22. By way of using pulsed light, interference lights can be effectively removed from the surroundings by calculation, so that a reliable monitoring of the detection region 21 and of the actuation region 22 can be carried out.

During the checking of the detection region 21 and of the actuation region 22, the pulsed images are compared with the non-pulsed images, wherein the mentioned checking of the distance change is carried out, during which the pulsed images are compared with the non-pulsed images. In order for the assembly module 20 according to the invention to consume as little energy as possible, the sensor system 30 can be switched between a rest mode 31 and an operating mode 32, which is shown in FIG. 14. According to FIG. 11, the sensor 50 is schematically shown adjacently arranged with the light sources 41. The display element 43 can be integrated in the light module 40. It is likewise conceivable to arrange the display element 43 spaced from the light module 40. The sensor 50 comprises a plurality of grid-type pixels. FIG. 12 shows the rest mode 31 of the optical sensor 50, in the case of which merely half of the pixels is evaluated. FIG. 9 shows the operating mode 32 in which merely four pixels are checked and evaluated, which correspond to the actuation region 22. The remaining pixels are pixels that have not been evaluated. The pixels shown white according to FIG. 8 and FIG. 9 are not taken into account with the evaluation so that energy can be saved during the operation of the assembly module 20.

FIG. 10 contains a plot of a light intensity I over the time ts. As shown, an image 61 is recorded after every time span t with the help of the sensor 50, wherein in the FIG. 10 in each case the time span is shown that is needed for an image 61. This can be a detection image 64 or a comparison image 63. The detection image 64 has been recorded with the help of light pulses 62 of the light module 40. Here, a plurality of light pulses 62 is necessary in order to generate an image 61. The light pulses 62 are emitted with a predetermined pulse frequency from the light module 40. Here, the pulse frequency during the rest mode 31 can be lower than that of the operating mode 32. Likewise, the image frequency which is obtained by the time span t can be lower in a rest mode 31 than in an operating mode 32. The light of the light pulses 62 of an image 61 received by the sensor 50 is integrated or added up in order to create the image 61. In order to carry out a distance measurement, the optical sensor system 30 presets a time interval tz in which the light pulses 62 generate an image 61. The distance of the user 10 to the optical sensor 50 is determined as a function of the intensity of the light pulses 62 in the time interval tz. In the comparison image 63, an image 61 is recorded without light pulses 62 of the light module 40 reaching the image sensor 50. To this end, the light module 40 does not emit any light. The pulsing of the light according to FIG. 10 is applicable for example in FIG. 1 and in all exemplary embodiments in order to remove in particular interference lights by calculation.

According to all exemplary embodiments, the actuation region 22 can be located on the ground 15. It is likewise conceivable that the actuation region 21 is located at a distance to the ground 15 and at the height of the sensor system 30, in particular at the height of the emblem 80. The actuation region 22 should merely be visible to the user 10 in order to address this actuation region 22 by way of a suitable action, gesture. For example, the actuation region 22 can be configured in such a manner that a hologram for the user 10 is created, which for example freely floating before the optical sensor system 30 spaced from the motor vehicle 1 and the ground 15 can be activated by the user. Obviously, the invention also includes that further signals can be triggered on the motor vehicle, such as for example the movement of a window in the case that the user 10 performs the corresponding action in the method step 130 according to FIG. 14.

According to FIG. 8 and FIG. 9, the optical sensor system 30 comprises an illumination element 45 which can be switched into different illumination states, which are schematically shown in FIG. 14. During the monitoring of the detection region 21 in the method step 100, the illumination element 45 is deactivated and thus does not emit any light which is shown with the reference number 150. In the case that the authentication check in the method step 110 is positive, the illumination element 45 assumes a first illumination state which according to FIG. 14 carries the reference number 160. In the present exemplary embodiment a continuous light is created on the illumination element 45 which can be detected by the user 10. Now the method step 120 takes place, during which the actuation region 22 is checked by the sensor system 30. The first illumination state 160 provides the user 10 with the information to move his hand near the emblem 80, in particular to activate the actuation region 22, which is located in the vicinity of the emblem 80. Once this has been performed by the user 10 the illumination element 45 changes into the second illumination state 170, which is represented by a flashing signal. This gives the user 10 the information to remove his hand from the actuation region 22. Following this, the illumination element 45 changes into a third illumination state 180, which is likewise a flashing signal, wherein the individual light signals are active longer than the shorter light signals from the illumination state 170.

Detecting a contamination or a defect can take place in the method step 140, wherein the control unit 160 receives for example the information of the method step 140. It is conceivable, for example, that according to the method step 140 the emergency actuation 90 is activated or switched ready for operation, so that a manual actuation of the emergency actuation 90 by the user 10 can trigger an operating signal for the vehicle 1 according to method step 130.

The assembly module 20 according to FIG. 1 can be employed both in the rear region 82 according to FIG. 5, FIG. 6 and FIG. 8 and also in the lateral region of the motor vehicle according to FIG. 7. Here, the method steps according to FIG. 14 are applicable to all exemplary embodiments according to FIG. 1 to FIG. 9, FIG. 15 as well as FIG. 16. FIG. 9 can also include the assembly module 20 and/or the method steps according to FIG. 14. FIG. 8 can also be further developed in such a manner that the illumination element 45 operates as display element 43 according to FIG. 1. In addition it is conceivable that an illumination of the number plate 7 (FIG. 8) via the display element 43 and/or the illumination element 45 can additionally take place. According to FIG. 2 and FIG. 3, it becomes schematically very clear that a very large detection region 21 can be monitored via the optical sensor system 30 according to the invention. Since however the near zone 23 and the actuation region 22 is very small, compared with the detection region 21, the operation of the optical sensor system 30 can be carried out in an energy-saving manner. A substantial contribution for the energy saving is supplied by the idea that the optical sensor system 30 can be switched between a rest mode 31 and an operating mode 32 and an authentication check according to step 110 can be carried out only in particular when the user 10 is located in the near zone 23.

FIG. 16 with FIG. 17 shows an assembly module 20, in particular an emblem 80, which is embodied with a sensor system 30, 70. The sensor system 30, 70 is an optical sensor system, which comprises an optical sensor 50, in particular a camera. In addition, a non-optical sensor 70 is provided, which in the present exemplary embodiment is a capacitive sensor. Obviously, the non-optical sensor 70 within the scope of this invention can also be a proximity sensor or a tactile sensor. The sensor 70 monitors the detection region 21. The optical sensor 50, by contrast, monitors the actuation region 22. According to the explanations regarding the already described exemplary embodiments, monitoring of the detection region 21 located outside the motor vehicle 1 initially takes place via the non-optical sensor 70. Detection of a user 10 takes place in the detection region 21. Furthermore, a signal for the start of an authentication check between the Id-transmitter 13, which the user 10 carries on him, and the motor vehicle 1 is triggered. Following this, the sensor 50 monitors the actuation region 22, wherein according to a defined gesture of the user in the actuation region 22, an operating signal for the motor vehicle 1 is provided. In the present exemplary embodiment it is necessary that the user 10 is present near the emblem 80 in a defined time window, in particular a part region of his body such as hand, elbow is positioned in the region of the capacitive sensor 70. If this defined first action of the user 10 is correct, the authentication check takes place. If the authentication check is positive, which means that the user 10 has the authorised Id-transmitter 13, the illumination element 45 is switched on into the first illumination state. The emblem 80 has a light source 47, in particular an LED, OLED etc. in the interior. Between the light source 47 and the illumination element 45 a light guiding element 48 is arranged, so that in the first illumination state or in all other illumination states light can be reliably emitted from the illumination element 45, which is clearly visible to the user. Furthermore, the electronic components can be arranged for example on a circuit board 46 within the emblem 80. According to FIG. 16 and FIG. 17, the illumination element 45 is ring-shaped designed. Obviously, alternative geometrical shapes are conceivable in order to let various illumination states be created on the emblem 80 for the user.

Once a positive authentication has taken place, monitoring of the actuation region 22 via the optical sensor 50 takes place. The actuation region 22 can be located for example in the immediate vicinity of the illumination element 45. It is conceivable, for example that by way of a light touch or close approach of the illumination element 45 a second action of the user 10 is defined in order to trigger the operating signal for the motor vehicle 1. The second action can for example be a defined gesture of the user. Here it is conceivable that the user has to perform the relative gesture in or on the actuation region 22 within a defined time window.

In addition, the emblem 80 comprises an emergency actuation in order to trigger the operating signal for the motor vehicle 1 in the case of a fault based on the sensor system 30, 70. The functioning of this emergency operation 90 substantially corresponds to the explanations according to FIG. 1. The emblem 80 according to FIG. 16 as well as according to FIG. 1 comprises a cover 83 towards the outside. The cover 83 is formed in such a manner that the electronic components in the interior of the emblem 80 are not visible. However, the cover 83 has the characteristic that the actuation region 22 and the detection region 21 can be reliably monitored. In particular in the region of the optical sensor 50 is the cover 83 embodied transparent in one direction so that the optical sensor 50 can reliably monitor the actuation region 22. In a further function of the exemplary embodiment according to FIGS. 16 and 17 it is conceivable that the optical sensor 50, in particular the camera can monitor the rearward region even while the motor vehicle is travelling. It is likewise conceivable in a further embodiment alternative, which is not explicitly shown, that the emblem during driving reverse can move from the in FIG. 16 closed position into an open position, and namely according to FIG. 16 towards the right in the outer region in the direction of the Id-transmitter 13. Thus, the optical sensor 50, in particular the camera is given a corresponding field of vision in order to serve as parking aid for the user 10. For example it is conceivable that the camera remains rigid and unchanged in its position according to FIG. 16. It is likewise conceivable that in the pivoted-out position of the emblem 80 the camera likewise pivots into a defined position in order to be able to monitor and record an optimal space of vision for the user 10 during reverse parking. The optical sensor 50 can for example be an LDPD or CCD sensor.

FIG. 18 and FIG. 19 show a further method sequence of an exemplary embodiment of an assembly module 20, in particular of an emblem 80, wherein the method sequence takes into account both the monitoring of the detection region 21 and also the monitoring of the actuation region 22. Here, the emblem 80 can be operated for example according to FIG. 16 and FIG. 17. In the method step 100, a check of the detection region 21 initially takes place by way of the non-optical sensor 70. If the user 10 with his hand or with his elbow is present on the non-optical sensor 70, this is detected by said sensor 70. In FIG. 18, a counting unit 205 is installed which operates as a kind of timer 205. The timer can be embodied with a defined time window, in particular one to three seconds. For as long as the sensor 70 suitably detects the user also in the method step 210, for example capacitively, the query takes place in the method step 210. In the case that the sensor 70 no longer detects the user within the detection region 21 within the default time window, the system returns to the start 310. In the case that the timer 205 has exceeded the default time window and the check according to method step 210 is positive, this means that the first action of the user corresponds to the defined action of the overall system, the method step 230 takes in that the control electronic of the motor vehicle 1 and/or of the assembly module 20 is woken up. Previously, it was detected in the method step 220 that the timer 205 has correspondingly run out of the time window, in particular that for example the time window of one to three seconds has already expired. Following this, the start of the Id-transmitter query takes place in the method step 240, wherein in the method step 250 the authentication check between the Id-transmitter 13 and the motor vehicle 1 is carried out. In the case that the Id-transmitter 13 is not the "correct one", the system restarts with method step 310. In the case that the authentication check is positive however, the monitoring of the detection region 21 is terminated and the monitoring of the actuation region 22 starts in that the method step 260 is initiated, in which the optical sensor 50, in particular the camera or the LDPD or the CCD chip, are activated. It is conceivable, for example, that the illumination element 45 of the optical sensor system 30, 70 is put into a first illumination state, which takes place in the method step 270. It is conceivable, for example that the illumination element 45 in the method step 270 flashes slowly. At the same time, a second timer 206 starts which likewise works as a counting unit. The time window of this counting unit or of this timer 206 can for example likewise take one to three seconds. In the method step 280 it is checked to what extent the correct gesture and/or action of the user 10 has taken place within the actuation region 22. If this produces a positive result, the method step 300 takes place, during which the illumination element is rendered into a further illumination state, for example that the illumination element flashes more quickly or a continuous light is produced. This is followed by method step 320, during which the boot lid opens. However, when the gesture of the user is detected as positive in the method step 280, the provision of the operating signal for the motor vehicle takes place beforehand. If the query according to method step 280 is negative and the counting unit according to method step 290 is still running (which means that for example the time window between one to three seconds has not yet expired), a query according to method step 280 takes place. In the case that the timer according to method step 290 has already expired and the check at 280 is negative, the system returns to the start 310.

A necessary condition for the method step 200 to start is that a query to the extent of which the travelling speed is ≤3 km per hour or the motor vehicle is stationary and does not move takes place beforehand. This condition must first be fulfilled so that monitoring of the detection region 21 and/or of the actuation region 22 according to FIG. 18 can take place.

FIG. 19 shows a further embodiment version which can be integrated in FIG. 18. FIG. 19 comprises a protection query, which interrupts and/or blocks the monitoring process with respect to the detection region 21 at least for a certain time when a certain number of actions of the user 10 was detected which does not correspond to the defined action, in order to get from the method step 220 to the method step 230. This means that unwittingly the non-optical sensor 70 detects an object in the detection region 21 multiple times but the time window for example according to the timer 205 has never expired. In a possible embodiment version it is conceivable that for example the user 10 has to perform a first defined action in the detection region 21 so that a start of the authentication check according to the method steps 240 and/or 250 is started. Here it is conceivable that the user holds for example his elbow or his hand near the sensor 70 for three seconds. However, if a user, who is not authorised, approaches the sensor 70 multiple times, wherein the sensor 70 is merely addressed for a second, wherein this action is repeated multiple times, the checking of the detection region 21 or of the actuation region 22 takes place in the method step 320 at least for a certain time. According to FIG. 19 it is exemplarily shown that after ten address attempts of a user 10 in the detection region 21 or on the non-optical sensor 70, blocking takes place.

It is conceivable, for example, that the non-optical sensor 70 is a capacitive sensor, which via the defined action of the user 10 falls under a default threshold value. In the case that this threshold value is not reached, the correct defined action of the user 10 is not present either. This can be integrated in the method steps 200 and 210.

REFERENCE LIST

1 Motor vehicle
2 Boot lid (moveable part)
3 Side door, sliding door (moveable part)
4 B-pillar
5 Door handle
6 Handle strip
7 Number plate
8 Door lock
10 User
11 Foot
12 Hand
13 Id-transmitter
14 Access control system
15 Ground
20 Assembly module
21 Detection region
22 Actuation region
23 Near zone
24 Distant zone
25 Receptacle
30 Optical sensor system
31 Rest mode
32 Operating mode
40 Light module
41 Light source
42 Lens system
43 Display element
44 Light, light bundle, light cone
45 Illumination element
46 Circuit board
47 Light source, LED, OLED
48 Light guiding element
50 Optical sensor
51 Lens system
60 Control unit
61 Image pulsed
62 Light pulse
63 Comparison image
64 Detection image
70 Non-optical sensor
80 Emblem
81 Fields
82 Motor vehicle rear
83 Cover
90 Emergency actuation
91 Activation means, push button, switch
100 Method step
110 Method step
120 Method step
130 Method step
140 Method step
150 Illumination state
160 Illumination state
170 Illumination state
180 Illumination state
200 Method step
205 Timer, counting unit
206 Timer, counting unit
210 Method step
220 Method step
230 Method step
240 Method step
250 Method step
260 Method step
270 Method step
280 Method step
290 Method step
300 Method step
310 Start
320 Method step
330 Method step

The invention claimed is:
1. A method for operating an emblem for a motor vehicle, the method comprising:
a) monitoring a detection region located outside the motor vehicle, b) triggering a signal for the start of an authentication check between an Id-transmitter and the motor vehicle in the case a user is detected in the detection region,
c) monitoring an actuation region which is located outside the motor vehicle and which differs from the detection region, and
d) providing an operating signal for the motor vehicle in the case that a user is detected in the actuation region,
wherein the motor vehicle comprises an emblem, which comprises an optical sensor system comprising an optical sensor configured for performing said method, and
wherein the optical sensor system at least receives or records images at least of the detection region or of the actuation region, wherein the images are pulsed images and non-pulsed images, wherein the pulsed images are created through the reflection of the emitted, pulsed light of the optical sensor system and the non-pulsed images are created through the light of at least the detection region or actuation region, in particular in that for the checking of a distance change the pulsed images are compared with the non-pulsed images.

2. The method according to claim 1, wherein
following a positive authentication according to b), an illumination element that is arranged on the sensor system is operated in a first illumination state.

3. The method according to claim 2, wherein
according to c) the illumination element is operated in a second illumination state, which differs from the first illumination state.

4. The method according to claim 3, wherein
according to step d) the illumination element is operated in a third illumination state, which differs at least from the first or from the second illumination state, wherein in particular an opening operation of a moveable part of the motor vehicle is carried out.

5. The method according to claim 3, wherein
providing the operating signal according to step d) takes place only when the illumination element is operated in the first or in the second illumination state, in particular in that at least the first or the second illumination state is operated only in a defined time during the step c).

6. The method according to claim 1, wherein
the detection region is divided into at least two zones, into a near zone and a distant zone, wherein the near zone lies at a shorter distance to the sensor system than the distant zone, wherein a detection of the user according to step b) takes place only when the user is located in the near zone, in particular at least that the detection region is continuously monitored or that step b) takes place when the user is located in the near zone.

7. The method according to claim 6, wherein
the sensor system carries out a check of a distance change in order to detect a user at least in the detection region or in the actuation region, which user approaches the motor vehicle, in particular in that the sensor system carries out a check of a distance change only in particular when the user is located in the near zone.

8. The method according to claim 6, wherein
the sensor system can be switched between a rest mode and an operating mode, wherein the sensor system in the rest mode is switched until the user reaches the near zone, in particular in that the pulse frequency of the emitted light in the rest mode is lower than in the operating mode.

9. The method according to claim 1, wherein
the detection of the user according to step c) or d) requires at least a defined gesture or action of the user.

10. The method according to claim 1, wherein
step c) takes place within a defined time window, in particular when at least no gesture or action of the user takes place within the defined time window, the step d) is not carried out.

11. The method according to claim 1, wherein
the sensor system emits light in the range that is not visible to the user, in particular in that the sensor system emits pulsed light.

12. The method according to claim 1, wherein
a display element is provided, which for the step c) emits light in the visible range in order to create an actuation region for the user, in particular in that the actuation region lies in the detection region.

13. The method according to claim 1, wherein
the sensor system comprises the optical sensor which receives light from at least the detection region or actuation region, wherein the sensor system comprises a control unit, which evaluates the data of the optical sensor.

14. The method according to claim 1, wherein
the sensor system comprises a light module which emits light, so that a transmission region is created, wherein the optical sensor comprises a receiving region, which at least partially overlaps with the transmission region, wherein the region of the overlap forms the detection region.

15. The method according to claim 1, wherein
the sensor system emits a plurality of light bundles, in particular light cones, which put together form the detection region.

16. The method according to claim 1, wherein
each image is composed of a defined total number of pixels, wherein for the checking of at least the detection region or actuation region only a number of pixels is checked which is smaller than the possible total number.

17. The method according to claim 1, wherein
during the step b) the Id-transmitter transmits an authentication code to an access control system of the motor vehicle and the access control system compares the authentication code with a stored code and in the case of agreement, triggers an unlocking signal.

18. The method according to claim 1, wherein
step d) takes place only in the case of a defined movement of the user or of a part of the body of the user in/on the actuation region, in particular in that the part of the body is a foot or a hand of the user.

19. The method according to claim 1,
wherein
the actuation region is located at a distance to the ground and to the sensor system, wherein in particular the actuation region is located approximately at the same height to the sensor system.

20. The method according to claim 1,
wherein
the optical sensor system comprises the optical sensor and a non-optical sensor, wherein the non-optical sensor is a proximity sensor or a tactile sensor or a capacitive sensor, wherein in particular the non-optical sensor monitors the detection region and the optical sensor the actuation region.

21. The method according to claim 20,
wherein
the step b) starts only when the non-optical sensor detects a defined first action of the user, in particular the optical sensor is activated, in order to monitor the actuation region according to step c) and the operating signal is provided only according to step b), when a second action of the user takes place.

22. The method according to claim 1,
wherein
a protection query is integrated, which at least interrupts or blocks the step a) at least for a certain time when a certain number of first actions was detected which does not correspond to the defined action, in order to carry out step c).

* * * * *